US012641243B2

(12) United States Patent
Cheong et al.

(10) Patent No.: US 12,641,243 B2
(45) Date of Patent: *May 26, 2026

(54) IMAGE ENCODING/DECODING METHOD AND DEVICE

(71) Applicant: Electronics and Telecommunications Research Institute, Daejeon (KR)

(72) Inventors: Won Sik Cheong, Daejeon (KR); Kug Jin Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/800,518

(22) Filed: Aug. 12, 2024

(65) Prior Publication Data

US 2024/0406402 A1    Dec. 5, 2024

Related U.S. Application Data

(63) Continuation of application No. 17/787,853, filed as application No. PCT/KR2020/018991 on Dec. 23, 2020, now Pat. No. 12,101,485.

(30) Foreign Application Priority Data

Dec. 24, 2019    (KR) ......................... 10-2019-0173689
Dec. 21, 2020    (KR) ......................... 10-2020-0180007

(51) Int. Cl.
*H04N 19/136*        (2014.01)
*H04N 19/172*        (2014.01)
*H04N 19/174*        (2014.01)
(52) U.S. Cl.
CPC ......... *H04N 19/136* (2014.11); *H04N 19/172* (2014.11); *H04N 19/174* (2014.11)

(58) Field of Classification Search
CPC ... H04N 19/172; H04N 19/174; H04N 19/136
See application file for complete search history.

(56) References Cited

U.S. PATENT DOCUMENTS

2013/0114735 A1    5/2013  Wang
2017/0280162 A1    9/2017  Zhao et al.
(Continued)

FOREIGN PATENT DOCUMENTS

KR      1020160034998 A     3/2016
KR      1020180008797 A     1/2018
(Continued)

OTHER PUBLICATIONS

Benjamin Bross et al., Versatile Video Coding (Draft 7), Joint Video Experts Team (JVET) of ITU-T SG 16 WP 3 and ISO/IEC JTC 1/SC 29/WG 11, [Document: JVET-P2001-vE (version 12)], 16th Meeting: Geneva, CH, pp. 1-464, Nov. 14, 2019.
(Continued)

*Primary Examiner* — Jonathan R Messmore
(74) *Attorney, Agent, or Firm* — WILLIAM PARK AND ASSOCIATES LTD.

(57) ABSTRACT

Disclosed herein are a video encoding/decoding method and apparatus. The video decoding method according to the present disclosure includes: when a current picture is composed of a plurality of tiles and a current tile among the plurality of tiles is partitioned into a plurality of slices, decoding information on the number of slices in tile that indicates the number of the plurality of slices comprised in the current tile; decoding information on a slice height in tile that indicates a height of the plurality of slices comprised in the current tile; and determining the number of the plurality of slices comprised in the current tile and a height of the plurality of slices comprised in the current tile.

12 Claims, 22 Drawing Sheets

(56) References Cited

U.S. PATENT DOCUMENTS

| | | | |
|---|---|---|---|
| 2018/0152702 | A1 | 5/2018 | Hattori et al. |
| 2019/0037216 | A1 | 1/2019 | Cho |
| 2019/0082178 | A1 | 3/2019 | Kim et al. |
| 2022/0021881 | A1* | 1/2022 | Wan ..................... H04N 19/119 |

FOREIGN PATENT DOCUMENTS

| | | |
|---|---|---|
| KR | 101912485 B1 | 10/2018 |
| KR | 1020190018938 A | 2/2019 |
| KR | 1020190118125 A | 10/2019 |
| TW | 201933871 A | 8/2019 |

OTHER PUBLICATIONS

Benjamin Bross et al., Versatile Video Coding Editorial Refinements on Draft 10, Joint Video Experts Team (JVET) of ITU-T SG 16 WP 3 and ISO/IEC JTC 1/SC 29, Document: JVET-T2001-v1, 20th Meeting, by teleconference, Oct. 7-16, 2020.

* cited by examiner reconstructed picture

200

210 entropy decoding unit 220 dequantization unit 230 inverse transform unit

255 +

260 filter unit 240 intra-prediction unit intra 250 motion compensation unit inter 270 reference picture buffer bitstream

SPLIT_BT_VER    SPLIT_BT_HOR    SPLIT_TT_VER    SPLIT_TT_HOR

510

☐ CTU    ☐ Tile    ☐ Slice

☐ Brick    ☐ Tile    ☐ Slice

Figure 9:
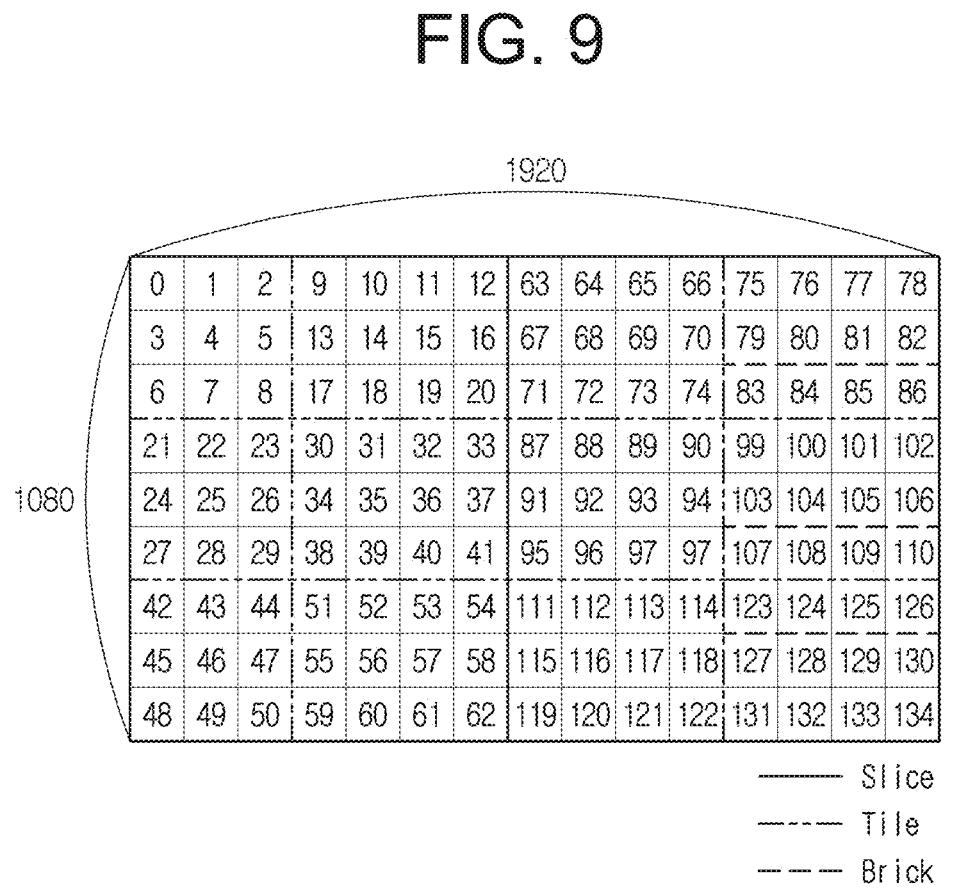

| 0 | 1 | 2 | 9 | 10 | 11 | 12 | 63 | 64 | 65 | 66 | 75 | 76 | 77 | 78 |
| 3 | 4 | 5 | 13 | 14 | 15 | 16 | 67 | 68 | 69 | 70 | 79 | 80 | 81 | 82 |
| 6 | 7 | 8 | 17 | 18 | 19 | 20 | 71 | 72 | 73 | 74 | 83 | 84 | 85 | 86 |
| 21 | 22 | 23 | 30 | 31 | 32 | 33 | 87 | 88 | 89 | 90 | 99 | 100 | 101 | 102 |
| 24 | 25 | 26 | 34 | 35 | 36 | 37 | 91 | 92 | 93 | 94 | 103 | 104 | 105 | 106 |
| 27 | 28 | 29 | 38 | 39 | 40 | 41 | 95 | 96 | 97 | 97 | 107 | 108 | 109 | 110 |
| 42 | 43 | 44 | 51 | 52 | 53 | 54 | 111 | 112 | 113 | 114 | 123 | 124 | 125 | 126 |
| 45 | 46 | 47 | 55 | 56 | 57 | 58 | 115 | 116 | 117 | 118 | 127 | 128 | 129 | 130 |
| 48 | 49 | 50 | 59 | 60 | 61 | 62 | 119 | 120 | 121 | 122 | 131 | 132 | 133 | 134 |

———— Slice
———— Tile
———— Brick

FIG. 10

| | Descriptor |
|---|---|
| pic_parameter_set_rbsp( ) { | |
| pps_pic_parameter_set_id | ue(v) |
| pps_seq_parameter_set_id | ue(v) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| output_flag_present_flag | u(1) |
| single_tile_in_pic_flag | u(1) |
| if( !single_tile_in_pic_flag ) { | |
| uniform_tile_spacing_flag | u(1) |
| if( uniform_tile_spacing_flag ) { | |
| tile_cols_width_minus1 | ue(v) |
| tile_rows_height_minus1 | ue(v) |
| } else { | |
| num_tile_columns_minus1 | ue(v) |
| num_tile_rows_minus1 | ue(v) |
| for( i = 0; i < num_tile_columns_minus1; i++ ) | |
| tile_column_width_minus1[ i ] | ue(v) |
| for( i = 0; i < num_tile_rows_minus1; i++ ) | |
| tile_row_height_minus1[ i ] | ue(v) |
| } | |

FIG. 11

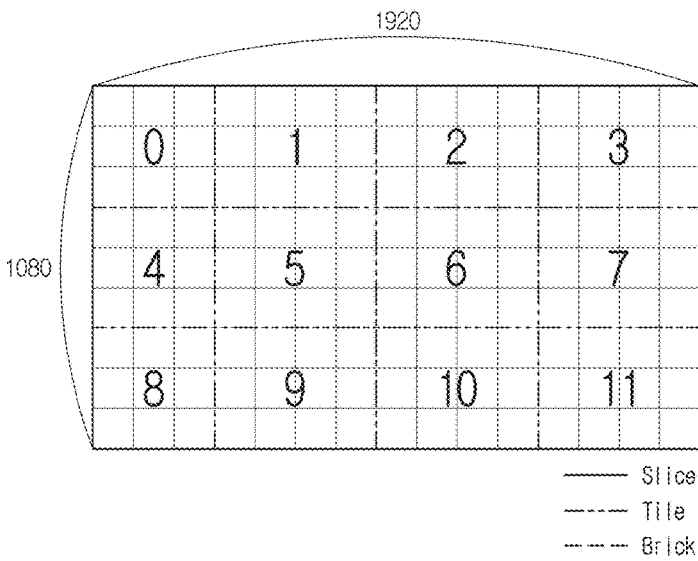

———— Slice
----- Tile
-·-·- Brick

FIG. 12

| | |
|---|---|
| brick_splitting_present_flag | u(1) |
| if( uniform_tile_spacing_flag   &&   brick_splitting_present_flag ) | |
|   num_tiles_in_pic_minus1 | ue(v) |
| for( i = 0; brick_splitting_present_flag   &&   i   <=   ▆▆▆▆▆▆▆▆▆▆▆ ; i++ ) { | |
|   if( RowHeight[ i ] > 1 ) | |
|     brick_split_flag[ i ] | u(1) |
|   if( brick_split_flag[ i ] ) { | |
|     if( RowHeight[ i ] > 2 ) | |
|       uniform_brick_spacing_flag[ i ] | u(1) |
|     if( uniform_brick_spacing_flag[ i ] ) | |
|       brick_height_minus1[ i ] | ue(v) |
|     else { | |
|       num_brick_rows_minus2[ i ] | ue(v) |
|       for( j = 0; j   <=   num_brick_rows_minus2[ i ]; j++ ) | |
|         brick_row_height_minus1[ i ][ j ] | ue(v) |
|     } | |
|   } | |
| } | |

———— Slice
– – – – Tile
— — — Brick

| | |
|---|---|
| single_brick_per_slice_flag | u(1) |
| if( !single_brick_per_slice_flag ) | |
| rect_slice_flag | u(1) |
| if( rect_slice_flag  &&   !single_brick_per_slice_flag ) { | |
| num_slices_in_pic_minus1 | ue(v) |
| bottom_right_brick_idx_length_minus1 | ue(v) |
| for( i = 0; i < num_slices_in_pic_minus1; i++ ) { | |
| bottom_right_brick_idx_delta[ i ] | u(v) |
| if( i > 0 ) | |
| brick_idx_delta_sign_flag | u(1) |
| } | |
| } | |

| | |
|---|---|
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i  <=   num_exp_tile_columns_minus1; i++ ) | |
| tile_column_width_minus1[ i ] | ue(v) |
| for( i = 0; i  <=   num_exp_tile_rows_minus1; i++ ) | |
| tile_row_height_minus1[ i ] | ue(v) |

FIG. 18

```
remainingWidthInCtbsY = PicWidthInCtbsY
for( i = 0; i < num_exp_tile_columns_minus1; i++ ) {
    colWidth[ i ] = tile_column_width_minus1[ i ] + 1
    remainingWidthInCtbsY  -=  colWidth[ i ]
}
uniformTileColWidth = tile_column_width_minus1[ num_exp_tile_columns_minus1 ] + 1
while( remainingWidthInCtbsY  >=  uniformTileColWidth ) {
    colWidth[ i++ ] = uniformTileColWidth
    remainingWidthInCtbsY  -=  uniformTileColWidth
}
if( remainingWidthInCtbsY > 0 )
    colWidth[ i++ ] = remainingWidthInCtbsY
NumTileColumns = i
```

FIG. 19

```
remainingHeightInCtbsY = PicHeightInCtbsY
for( j = 0; j < num_exp_tile_rows_minus1; j++ ) {
    RowHeight[ j ] = tile_row_height_minus1[ j ] + 1
    remainingHeightInCtbsY  -=  RowHeight[ j ]
}
uniformTileRowHeight = tile_row_height_minus1[ num_exp_tile_rows_minus1 ] + 1
while( remainingHeightInCtbsY  >=  uniformTileRowHeight ) {
    RowHeight[ j++ ] = uniformTileRowHeight
    remainingHeightInCtbsY  -=  uniformTileRowHeight
}
if( remainingHeightInCtbsY > 0 )
    RowHeight[ j++ ] = remainingHeightInCtbsY
NumTileRows = j
```

FIG. 21

| | Descriptor |
|---|---|
| rect_slice_flag | u(1) |
| if( rect_slice_flag ) | |
|   single_slice_per_subpic_flag | u(1) |
| if( rect_slice_flag && !single_slice_per_subpic_flag ) { | |
|   num_slices_in_pic_minus1 | ue(v) |
|   tile_idx_delta_present_flag | u(1) |
|   for( i = 0; i < num_slices_in_pic_minus1; i++ ) { | |
|     slice_width_in_tiles_minus1[ i ] | ue(v) |
|     slice_height_in_tiles_minus1[ i ] | ue(v) |
|     if( slice_width_in_tiles_minus1[ i ] == 0 && slice_height_in_tiles_minus1[ i ] == 0 ) { | |
|       num_slices_in_tile_minus1[ i ] | ue(v) |
|       numSlicesInTileMinus1 = num_slices_in_tile_minus1[ i ] | |
|       for( j = 0; j < numSlicesInTileMinus1; j++ ) | |
|         slice_height_in_ctu_minus1[ i++ ] | ue(v) |
|     } | |
|     if( tile_idx_delta_present_flag && i < num_slices_in_pic_minus1 ) | |
|       tile_idx_delta[ i ] | se(v) |
|   } | |
|   } | |

FIG. 23

| | |
|---|---|
| rect_slice_flag | u(1) |
| if( rect_slice_flag ) | |
|     single_slice_per_subpic_flag | u(1) |
| if( rect_slice_flag  &&  !single_slice_per_subpic_flag ) { | |
|     num_slices_in_pic_minus1 | ue(v) |
|     tile_idx_delta_present_flag | u(1) |
|     for( i = 0; i < num_slices_in_pic_minus1; i++ ) { | |
|       slice_width_in_tiles_minus1[ i ] | ue(v) |
|       slice_height_in_tiles_minus1[ i ] | ue(v) |
|       if( slice_width_in_tiles_minus1[ i ]  ==  0  && <br>         slice_height_in_tiles_minus1[ i ]  ==  0 ) { | |
|         num_exp_slices_in_tile[ i ] | ue(v) |
|         numExpSlicesInTile = num_exp_slices_in_tile[ i ] | |
|         for( j = 0; j < numExpSlicesInTile; j++ ) | |
|           slice_height_in_ctu_minus1[ i++ ] | ue(v) |
|         if( numExpSlicesInTile ) | |
|           i += (numExpSlicesInTile-1) | |
|       } | |
|       if( tile_idx_delta_present_flag  &&  i < num_slices_in_pic_minus1 ) | |
|       tile_idx_delta[ i ] | se(v) |
|     } | |
|     } | |

FIG. 24

| | |
|---|---|
| if( pps_rect_slice_flag && !pps_single_slice_per_subpic_flag ) { | |
|   pps_num_slices_in_pic_minus1 | ue(v) |
|   if( pps_num_slices_in_pic_minus1 > 1 ) | |
|     pps_tile_idx_delta_present_flag | u(1) |
|   for( i = 0; i < pps_num_slices_in_pic_minus1; i++ ) { | |
|     if( SliceTopLeftTileIdx[ i ] % NumTileColumns != NumTileColumns − 1 ) | |
|       pps_slice_width_in_tiles_minus1[ i ] | ue(v) |
|     if( SliceTopLeftTileIdx[ i ] / NumTileColumns != NumTileRows − 1 && | |
|       ( pps_tile_idx_delta_present_flag \|\| | |
|       SliceTopLeftTileIdx[ i ] % NumTileColumns == 0 ) ) | |
|       pps_slice_height_in_tiles_minus1[ i ] | ue(v) |
|     if( pps_slice_width_in_tiles_minus1[ i ] == 0 && | |
|       pps_slice_height_in_tiles_minus1[ i ] == 0 && | |
|       RowHeightVal[ SliceTopLeftTileIdx[ i ] / NumTileColumns ] > 1 ) { | |
|       pps_num_exp_slices_in_tile[ i ] | ue(v) |
|       for( j = 0; j < pps_num_exp_slices_in_tile[ i ]; j++ ) | |
|         pps_exp_slice_height_in_ctus_minus1[ i ][ j ] | ue(v) |
|       i += NumSlicesInTile[ i ] − 1 | |
|     } | |
|     if( pps_tile_idx_delta_present_flag && i < pps_num_slices_in_pic_minus1 ) | |
|       pps_tile_idx_delta_val[ i ] | se(v) |
|   } | |

FIG. 25

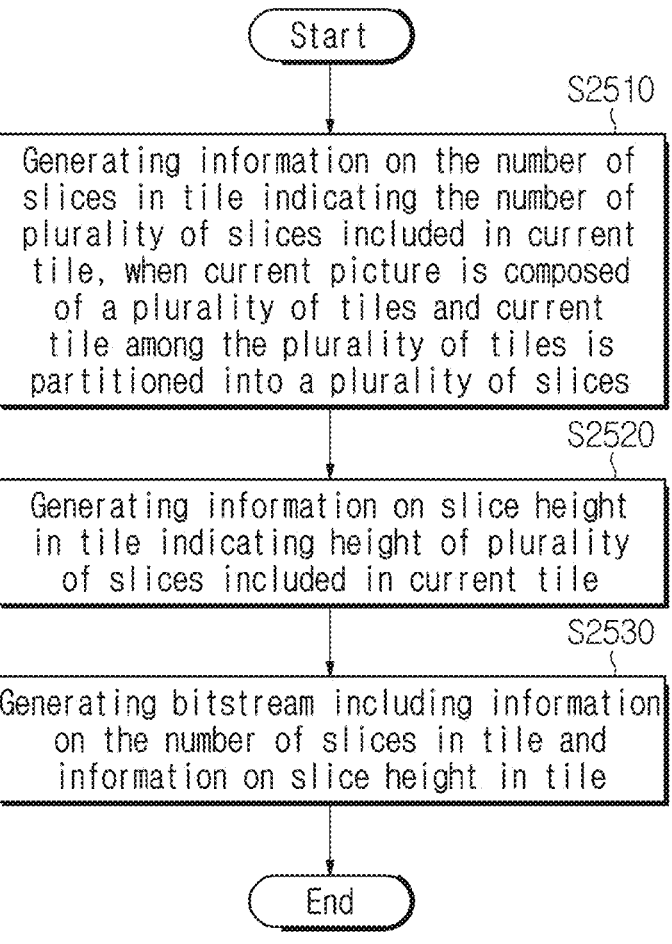

Start

S2510

Generating information on the number of slices in tile indicating the number of plurality of slices included in current tile, when current picture is composed of a plurality of tiles and current tile among the plurality of tiles is partitioned into a plurality of slices

S2520

Generating information on slice height in tile indicating height of plurality of slices included in current tile

S2530

Generating bitstream including information on the number of slices in tile and information on slice height in tile End

IMAGE ENCODING/DECODING METHOD AND DEVICE

CROSS-REFERENCE TO RELATED APPLICATIONS

The present application is a continuation application of U.S. Application Ser. No. 17/787,853, filed on Jun. 21, 2022, which was the National Stage of International Application No. PCT/KR2020/018991 filed on Dec. 23, 2020, which claims priority under 35 U.S.C. § 119 (a) to Korean Patent Applications: KR10-2019-0173689, filed on Dec. 24, 2019, and KR10-2020-0180007, filed on Dec. 21, 2020, in the Korean Intellectual Property Office, which applications are incorporated herein by reference in their entirety.

TECHNICAL FIELD

The present disclosure relates to a video encoding/decoding method and apparatus. More particularly, the present disclosure relates to a video encoding/decoding method and apparatus using a slice, a tile and a brick in a current picture and to a recoding medium for storing a bitstream generated by a video encoding/decoding method or apparatus of the present disclosure.

BACKGROUND ART

Recently, the demand for high-resolution and high-quality images such as high definition (HD) images and ultra high definition (UHD) images has increased in various application fields. As image data with higher resolution and higher quality increase data volumes in comparison with conventional image data. Accordingly, when transmitting image data by using a medium such as conventional wired and wireless broadband networks, or when storing image data by using a conventional storage medium, costs of transmitting and storing increase. In order to solve such problems with high resolution and quality image data, a high efficiency image encoding/decoding technique is required.

DISCLOSURE

Technical Problem

The present disclosure is directed to provide a video encoding/decoding method and apparatus with enhanced compression efficiency.

In addition, the present disclosure is directed to provide a video encoding/decoding method and apparatus that partition a current picture into slices.

In addition, the present disclosure is directed to provide a video encoding/decoding method and apparatus that partition a tile in a current picture into bricks.

In addition, the present disclosure is directed to provide a video encoding/decoding method and apparatus that partition a slice into tiles.

In addition, the present disclosure is directed to provide a video encoding/decoding method and apparatus that partition a tile into slices.

In addition, the present disclosure is directed to provide a recording medium for storing a bitstream generated by a video encoding/decoding method or apparatus of the present disclosure.

Technical Solution

According to the present disclosure, a video encoding method may be provided which includes: when a current picture is composed of a plurality of tiles and a current tile among the plurality of tiles is partitioned into a plurality of slices, generating information on the number of slices in tile indicating the number of the plurality of slices included in the current tile; generating information on a slice height in tile indicating a height of the plurality of slices included in the current tile; and generating a bitstream including the information on the number of slices in tile and the information on a slice height in tile.

For a last slice among the plurality of slices included in the current tile, information on a slice height in tile may not be generated.

Generating rectangular slice information indicating whether or not one or more slices included in the current picture are rectangular may be further included, and when the one or more slices are rectangular, the information on the number of slices in tile and the information on the slice height in tile may be encoded.

Generating single slice information indicating whether or not only one slice is included in the current picture may be further included, and when a plurality of slices are included in the current picture, the information on the number of slices in tile and the information on the slice height in tile may be encoded.

When a plurality of slices are included in the current picture, generating information on the number of slices in picture indicating the number of the plurality of slices in the current picture may be further included.

Generating slice size information indicating a size of a current slice in tile units among a plurality of slices included in the current picture may be further included, and when a size of the current slice is smaller than or equal to a size of the current tile, the information on the number of slices in tile may be generated.

Generating information on the number of slice heights in tile indicating the number of types of a plurality of slice heights included in the current tile may be further included.

Generating single tile information indicating whether or not a plurality of tiles are included in the current picture may be further included. Generating tile height information indicating a height of the plurality of tiles and tile width information indicating a width of the plurality of tiles, when the plurality of tiles are included in the current picture, may be further included.

Tile width information for a width of a right boundary tile existing on a right boundary of the current picture among the plurality of tiles may not be generated.

Tile height information for a row height of a bottom boundary tile existing on a bottom boundary of the current picture among the plurality of tiles may not be generated.

Information on a slice height in the tile may be generated only for a first slice among a plurality of successive slices including a last slice of the tile and having a same height.

A video decoding method may be provided which includes: when a current picture is composed of a plurality of tiles and a current tile among the plurality of tiles is partitioned into a plurality of slices, decoding information on the number of slices in tile indicating the number of the plurality of slices included in the current tile; decoding information on a slice height in tile indicating a height of the plurality of slices included in the current tile; and determining the number of the plurality of slices included in the current tile and the height of the plurality of slices included in the current tile.

The height of the plurality of slices indicated by the information on a slice height in tile is in CTUs (Coding Tree Units) or in CTBs (Coding Tree Blocks).

A last slice among the plurality of slices included in the current tile may be inferred using a height of the current tile and a height of the remaining slices except the last slice.

Decoding rectangular slice information indicating whether or not one or more slices included in the current picture are rectangular may be further included, and when the one or more slices are rectangular, the information on the number of slices in tile and the information on the slice height in tile may be decoded.

Decoding single slice information indicating whether or not only one slice is included in the current picture may be further included, and when a plurality of slices are included in the current picture, the information on the number of slices in tile and the information on the slice height in tile may be decoded.

When a plurality of slices are included in the current picture, decoding information on the number of slices in picture indicating the number of the plurality of slices in the current picture may be further included.

Decoding slice size information indicating a size of a current slice in tile units among a plurality of slices included in the current picture may be further included, and when the size of the current slice is smaller than or equal to a size of the current tile, the information on the number of slices in tile may be decoded.

Decoding information on the number of slice heights in tile indicating the number of types of a plurality of slice heights included in the current tile may be further included.

Decoding single tile information indicating whether or not a plurality of tiles are included in the current picture may be further included. Decoding tile height information indicating a height of the plurality of tiles and tile width information indicating a width of the plurality of tiles, when the plurality of tiles are included in the current picture, may be further included.

A width of a right boundary tile existing on a right boundary of the current picture among the plurality of tiles may be inferred using a width of the current picture and a width of the remaining tiles on the same row as the right boundary tile.

A height of a row of a bottom boundary tile existing on a bottom boundary of the current picture among the plurality of tiles may be inferred using a height of the current picture and a height of the remaining tiles on the same column as the bottom boundary tile.

Information on a slice height in the tile may be decoded only for a first slice among a plurality of successive slices including a last slice of the tile and having a same height.

A computer-readable recording medium for storing a bitstream including video encoding data that are decoded according to a video decoding method may be provided. The video decoding method may include: when a current picture is composed of a plurality of tiles and a current tile among the plurality of tiles is partitioned into a plurality of slices, decoding information on the number of slices in tile indicating the number of the plurality of slices included in the current tile; decoding information on a slice height in tile indicating a height of the plurality of slices included in the current tile; and determining the number of the plurality of slices included in the current tile and the height of the plurality of slices included in the current tile.

Advantageous Effects

According to the present disclosure, a video encoding/decoding method and apparatus with enhanced compression efficiency may be provided.

In addition, according to the present disclosure, a video encoding/decoding method and apparatus partitioning a current picture into slices may be provided.

In addition, according to the present disclosure, a video encoding/decoding method and apparatus partitioning a tile in a current picture into bricks may be provided.

In addition, according to the present disclosure, a video encoding/decoding method and apparatus partitioning a slice into tiles may be provided.

In addition, according to the present disclosure, a video encoding/decoding method and apparatus partitioning a tile into slices may be provided.

DESCRIPTION OF DRAWINGS

FIG. 9 describes slices, tiles and CTUs constituting a picture according to another embodiment of the present disclosure.

FIG. 10 describes a method (syntax) by which the picture partition information of FIG. 9 is signaled through PPS according to an embodiment of the present disclosure.

FIG. 11 describes partitioning of tiles in a picture according to the signaling of FIG. 10 in accordance with an embodiment of the present disclosure.

FIG. 12 describes a method (syntax) by which partition information of a brick is signaled through PPS according to an embodiment of the present disclosure.

FIG. 18 describes a method (syntax) by which width information of a tile column in a picture is signaled according to an embodiment of the present disclosure.

FIG. 19 describes a method (syntax) by which height information of a tile row in a picture is signaled according to an embodiment of the present disclosure.

FIG. 21 describes a method (syntax) by which slice information in a picture and a tile is signaled according to an embodiment of the present disclosure.

FIG. 23 describes a method (syntax) by which slice information in a picture and a tile is signaled according to another embodiment of the present disclosure.

FIG. 24 describes a method (syntax) by which slice information in a picture and a tile is signaled according to yet another embodiment of the present disclosure.

FIG. 25 describes a method of decoding a video according to an embodiment of the present disclosure.

MODE FOR INVENTION

Figure 1:
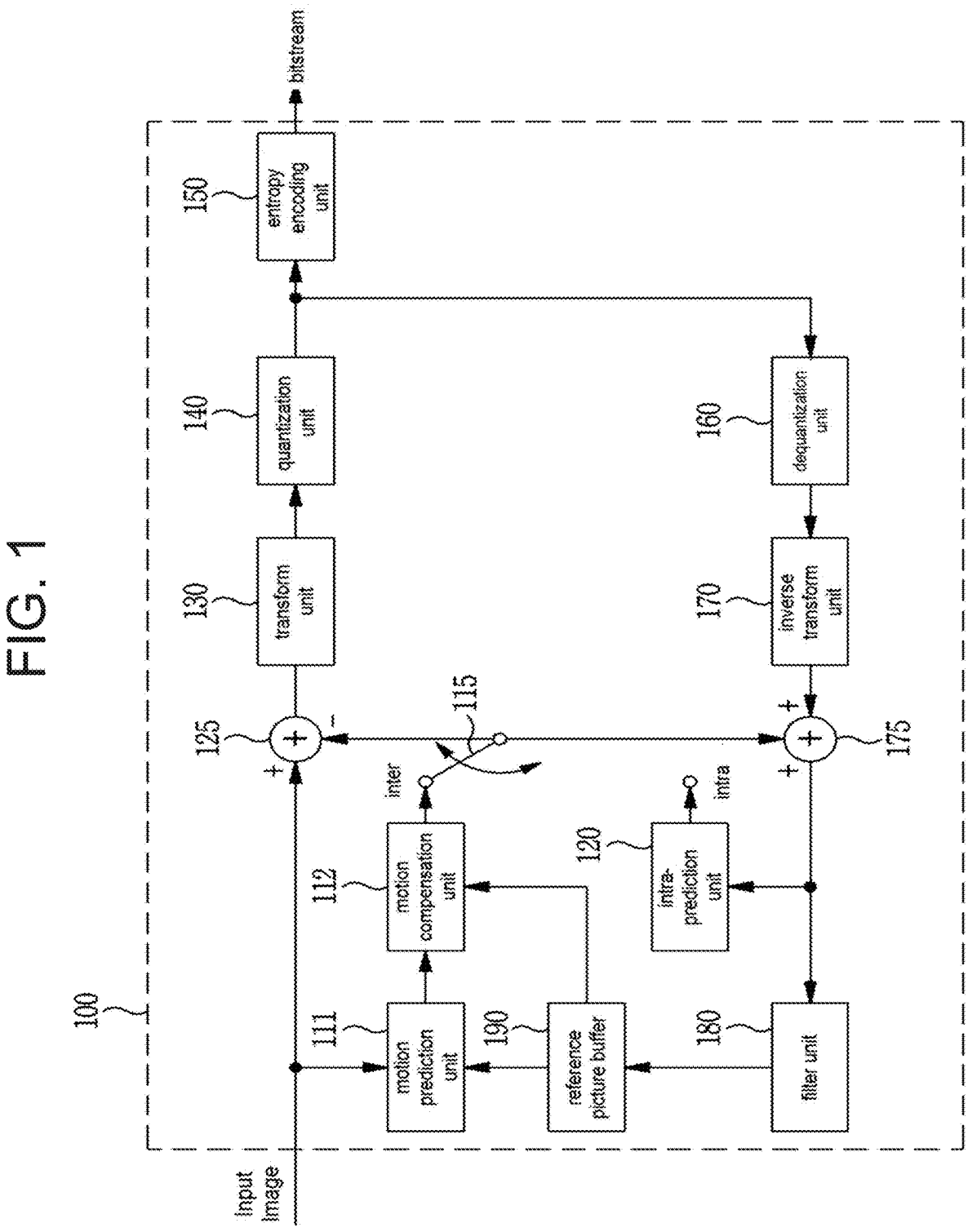
FIG. 1 is a block diagram showing a configuration of an encoding apparatus according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments may be construed as including all modifications, equivalents, or substitutes in a technical concept and a technical scope of the present disclosure. In the drawings, similar reference numerals refer to same or similar functions in various aspects. In the drawings, the shapes and dimensions of elements may be exaggerated for clarity. In the following detailed description of the present disclosure, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific shapes, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

Terms used in the present disclosure, 'first', 'second', and the like may be used to describe various components, but the components are not to be construed as being limited to the terms. The terms are used only to differentiate one component from other components. For example, the 'first' component be named the 'second' component without departing from the scope of the present disclosure, and the 'second' component may also be similarly named the 'first' component. The term 'and/or' includes a combination of a plurality of relevant items or any one of a plurality of relevant terms.

When an element is simply referred to as being 'connected to' or 'coupled to' another element in the present description, it should be understood that the former element is directly connected to or directly coupled to the latter element or the former element is connected to or coupled to the latter element, having yet another element intervening therebetween. In contrast, when an element is referred to as being "directly coupled" or "directly connected" to another element, it should be understood that there is no intervening element therebetween.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for better understanding and ease of description. Thus, at least two constitutional parts of each constitutional part may be combined to form one constitutional part or one constitutional part may be divided into a plurality of constitutional parts to perform each function. Both an embodiment where each constitutional part is combined and another embodiment where one constitutional part is divided are also included in the scope of the present disclosure, if not departing from the essence of the present disclosure.

The terms used in the present disclosure are merely used to describe particular embodiments, and are not intended to limit the present disclosure. Singular expressions encompass plural expressions unless the context clearly indicates otherwise. In the present disclosure, it is to be understood that terms such as "include", "have", etc. are intended to indicate the existence of the features, numbers, steps, actions, elements, parts, or combinations thereof disclosed in the specification but are not intended to preclude the possibility of the presence or addition of one or more other features, numbers, steps, actions, elements, parts, or combinations thereof. In other words, when a specific element is referred to as being "included", other elements than the corresponding element are not excluded, but additional elements may be included in the embodiments of the present disclosure or the technical scope of the present disclosure.

In addition, some of components may not be indispensable ones performing essential functions of the present disclosure but may be selective ones only for improving performance. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present specification. Identical constituent elements in the drawings are denoted by identical reference numerals, and a repeated description of identical elements will be omitted.

Hereinafter, an image may mean a picture configuring a video, or may mean the video itself. For example, "encoding or decoding or both of an image" may mean "encoding or decoding or both of a video", and may mean "encoding or decoding or both of one image among images configuring a video." Here, terms "picture" and "image" may have the same meaning.

Description of Terms

Encoder: may mean an apparatus performing encoding.

Decoder: may mean an apparatus performing decoding.

Parsing: may mean determination of the value of a syntax element by performing entropy decoding, or may mean the entropy decoding itself.

Block: is an M×N array of a sample. Herein, M and N may mean positive integers, and the block may mean a sample array of a two-dimensional form.

Sample: is a basic unit constituting a block. It may be expressed as a value from 0 to $2Bd-1$ according to a bit depth (Bd). In the present disclosure, a pixel may be used in the same meaning as a sample.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block, a prediction unit, a prediction block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor block: may mean a reconstructed unit adjacent to an encoding/decoding target unit and which has been already spatially/temporally encoded or decoded.

Unit Depth: may mean a partitioned degree of a unit. In a tree structure, the root node may have the shallowest depth, and the leaf node may have the deepest depth.

Symbol: may mean a syntax element of an encoding/decoding target unit, a coding parameter, a transform coefficient value, etc.

Parameter Set: may correspond to header information among a configuration within a bitstream. At least one of a video parameter set, a sequence parameter set, a picture parameter set, and an adaptation parameter set may be included in a parameter set. In addition, a parameter set may have a meaning including slice header and tile header information.

Bitstream: may mean a bitstream including encoding image information.

Prediction Unit: may mean a basic unit when performing inter-prediction, intra-prediction and compensation therefor. A single prediction unit may be partitioned into a plurality of partitions having a smaller size. In such a case, each of the plurality of partitions is a basic unit in performing prediction and compensation. A partition which is generated by dividing a prediction unit may also be a prediction unit. A prediction unit may have various sizes and forms, and particularly, the form of a prediction unit may be a two-dimensional geometrical figure such as a rectangular shape, a square shape, a trapezoid shape, a triangular shape, a pentagonal shape, etc.

Prediction Unit Partition: may mean a form obtained by partitioning a prediction unit.

Reference Picture List: may refer to a list including one or more reference pictures used for inter prediction or motion compensation. Types of reference picture lists may be LC (List combined), L0 (List 0), L1 (List 1), L2 (List 2), L3 (List 3), etc. One or more reference picture lists may be used for inter prediction.

Inter Prediction Indicator: may refer to a direction of inter prediction (unidirectional prediction, bidirectional prediction, etc.) of an encoding/decoding target block when performing inter prediction, the number of reference pictures used by the encoding/decoding target block for generating a prediction block, or the number of prediction blocks used by the encoding/decoding target block for performing inter prediction or motion compensation.

Reference Picture Index: may refer to an index indicating a specific reference picture in a reference picture list.

Reference Picture: may mean a reference picture which is referred to by a specific block for the purposes of inter prediction or motion compensation of the specific block.

Motion vector: may be a two-dimensional vector used for inter prediction or motion compensation. The motion vector may mean an offset between an encoding/decoding target picture and a reference picture. For example, (mvX, mvY) may represent a motion vector. Here, mvX may represent a horizontal component and mvY may represent a vertical component.

Motion Vector Candidate including at least one of information, a reference picture and a motion vector candidate index: may refer to a prediction candidate unit or a motion vector of the unit when predicting a motion vector.

Motion Vector Candidate List: may mean a list configured using a motion vector candidate.

Motion Vector Candidate Index: may mean an indicator indicating a motion vector candidate in a motion vector candidate list. Alternatively, it may be an index of a motion vector predictor.

Motion Information: may mean not only a motion vector, a reference picture index and an inter prediction indicator but also reference picture list information.

Merge Candidate List: may mean a list configured using a merge candidate.

Merge Candidate: may mean a spatial merge candidate, a temporal merge candidate, a combined merge candidate, a combined bi-predictive merge candidate, or a zero merge candidate. The merge candidate may include motion information such as prediction type information, a reference picture index for each list, a motion vector, etc.

Merge Index: may mean information indicating a merge candidate in a merge candidate list. Alternatively, the merge index may indicate a block from which a merge candidate has been derived, among reconstructed blocks spatially/temporally adjacent to a current block. In addition, the merge index may indicate at least one piece of motion information of a merge candidate.

Transform Unit: may mean a basic unit when performing residual signal encoding/decoding such as transform, inverse-transform, quantization, dequantization, transform coefficient encoding/decoding. A single transform unit may be partitioned into a plurality of transform units having a smaller size. A transform unit may have various sizes and forms, and particularly, the form of a transform unit may be a two-dimensional geometrical figure such as a rectangular shape, a square shape, a trapezoid shape, a triangular shape, a pentagonal shape, etc.

Scaling: may mean a process of multiplying a transform coefficient level by a factor. A transform coefficient may be generated as a result. The scaling also may be referred to as dequantization.

Quantization Parameter: may mean a value used when scaling a transform coefficient level during quantization and dequantization. Herein, the quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scan, and changing a one-dimensional matrix of coefficients into a two-dimensional matrix may be referred to as scan or inverse scan.

Transform Coefficient: may mean a coefficient value generated after transform is performed. In the present disclosure, a transform coefficient level obtained by applying quantization to a transform coefficient may also fall within the meaning of the transform coefficient.

Non-zero Transform Coefficient: may mean a transform coefficient having a value other than zero, or a transform coefficient level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is transmitted/received by a user.

FIG. 1 is a block diagram showing a configuration of an encoding apparatus according to an embodiment of the present disclosure.

An encoding apparatus 100 may be a video encoding apparatus or an image encoding apparatus. A video may include at least one image. The encoding apparatus 100 may sequentially encode at least one image of video according to time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, the encoding apparatus 100 may generate a bitstream through encoding of the input image, and output the generated bitstream. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual between an input block and a prediction block after the prediction block is generated. The input image may be called as a current image that is a current encoding target. The input block may be called as a current block that is a current encoding target, or as an encoding target block.

When a prediction mode is an intra mode, the intra-prediction unit 120 may use the pixel value of a block that has been already encoded/decoded and is adjacent to a current block as a reference pixel. The intra-prediction unit 120 may perform spatial prediction by using a reference pixel and generate prediction samples of an input block through spatial prediction. Herein, the intra prediction may mean intra-prediction.

When a prediction mode is an inter mode, the motion prediction unit 111 may retrieve a region that best matches with an input block from a reference image when performing motion prediction, and deduce a motion vector by using the retrieved region. The reference image may be stored in the reference picture buffer 190.

The motion compensation unit 112 may generate a prediction block by performing motion compensation using a motion vector. Here, the motion vector may be a two-dimensional vector used for inter prediction. In addition, the motion vector may represent an offset between a current image and a reference picture. Here, the inter prediction may mean inter-picture prediction.

When the value of the motion vector is not an integer, the motion prediction unit 111 and the motion compensation unit 112 may generate the prediction block by applying an interpolation filter to a partial region of the reference picture. In order to perform inter-picture prediction or motion compensation, it may be determined what method the motion prediction and motion compensation method of a prediction unit included in the corresponding coding unit is among a skip mode, a merge mode, an advanced motion vector prediction (AMVP) mode, and a current picture referring mode. Inter-picture prediction or motion compensation may be performed according to each mode. Herein, the current picture referring mode may refer to a prediction mode using a pre-reconstructed region in a current picture in which an encoding target block is included. To specify the pre-reconstructed region, a motion vector for the current picture referring mode may be defined. Whether or not an encoding target block is encoded into a current picture referring mode may be encoded using a reference picture index of the encoding target block.

The subtractor 125 may generate a residual block by using a difference between an input block and a prediction block. The residual block may be called as a residual signal.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized transform coefficient level may be generated by applying quantization to a transform coefficient. In the embodiments hereinafter, a quantized transform coefficient level may also be referred to as a transform coefficient.

The quantization unit 140 may generate a quantized transform coefficient level by quantizing a transform coefficient according to a quantization parameter, and output the quantized transform coefficient level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding on information for decoding an image, along with information on a pixel of an image. For example, the information for decoding an image may include a syntax element, etc.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. Accordingly, the compression performance of image encoding may be enhanced through entropy encoding. The entropy encoding unit 150 may use encoding method an for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin and then perform arithmetic coding by using the deduced binarization method or the deduced probability model.

In order to encode a transform coefficient level, the entropy encoding unit 150 may change a two-dimensional block form coefficient into a one-dimensional vector form through a transform coefficient scanning method. For example, it may change into a one-dimensional vector form by scanning the coefficients of the block using upright scanning. Depending on the size of a transform block and the intra prediction mode, instead of up-right scan, the horizontal scan of horizontally scanning a two-dimensional block form of coefficients or the vertical scan of vertically scanning a two-dimensional block form of coefficients may be used. In other words, depending on the size of a transform unit and the intra prediction mode, it may be determined which scan method is to be used among the up-right scan, the vertical scan and the horizontal scan.

A coding parameter may include not only information such as a syntax element that is encoded in an encoder and transmitted to a decoder but also other information derived during an encoding or decoding process. It may mean information required for encoding or decoding an image. For example, a coding parameter may include a value and/or statistics for at least one of the followings: an intra prediction mode, an inter prediction mode, an intra prediction direction, motion information, a motion vector, a reference image index, an inter prediction direction, an a inter prediction indicator, a reference picture list, motion vector predictor, a motion merge candidate, a transform type, a transform size, whether or not to use an additional transform, in-loop filter information, whether or not there is a residual signal, a quantization parameter, a context model, a transform coefficient, a transform coefficient level, a coded block pattern, a coded block flag, an image displaying/outputting sequence, slice information, tile information, a picture type, whether or not to use a motion merge mode, whether or not to use a skip mode, a block size, a block depth, block partition information, a unit size, a unit depth, and unit partition information.

The residual signal may mean a difference between an original signal and a prediction signal. Alternatively, the residual signal may be a signal generated by transforming a difference between the original signal and the prediction signal. Alternatively, the residual signal may be a signal that is generated by transforming and quantizing a difference between an original signal and a prediction signal. The residual block may be a residual signal of a block unit.

When the encoding apparatus 100 performs encoding through inter prediction, an encoded current image may be used as a reference picture for another image (other images) processed afterwards. Accordingly, the encoding apparatus 100 may decode the encoded current image and store the decoded image as a reference image. For decoding, dequantization and inverse transform may be processed on the encoded current image.

A quantized level may be dequantized in the dequantization unit 160 and be inverse-transformed in the inverse-transform unit 170. A dequantized and inverse-transformed coefficient may be added with a prediction block by the adder 175. By adding the dequantized and inverse-transformed coefficient with the prediction block, a reconstructed block may be generated.

A reconstructed block may pass through the filter unit 180. The filter unit 180 may apply at least one of a deblocking filter, a sample adaptive offset (SAO), and an adaptive loop filter (ALF) to a reconstructed block or a reconstructed image. The filter unit 180 may be referred to as an in-loop filter.

A deblocking filter may remove block distortion generated in a boundary between blocks. In order to determine whether or not to perform a deblocking filter, whether or not to apply a deblocking filter to a current block may be determined based on pixels included in several rows or columns of a block. When a deblocking filter is applied to a block, a strong filter or a weak filter may be applied according to a necessary deblocking filtering strength. In addition, when the vertical filtering and the horizontal filtering are performed for applying a deblocking filter, the horizontal filtering and the vertical filtering may be set to be processed concurrently.

In order to compensate an encoding error, a sample adaptive offset may add a proper offset value to a pixel value. The sample adaptive offset may correct an offset of a deblocked image from an original image by a sample unit. In order to perform offset correction for a specific picture, a method of partitioning pixels included in an image into a predetermined number of regions, determining a region in which offset is to be performed, and applying offset to the region may be used. Alternatively, a method of applying offset in consideration of edge information of each sample may be used.

The adaptive loop filter may perform filtering based on a comparison result of the filtered reconstructed image and the original image. After pixels included in an image are divided into a predetermined number of groups, a filter to be applied to a corresponding group may be determined to differentially perform filtering on each group. Information on whether or not to apply an adaptive loop filter may be transmitted by coding unit (CU), and the form and filter coefficient of the adaptive loop filter to be applied may vary according to each block. In addition, an adaptive loop filter with the same form (fixed form) may be applied, irrespective of the feature of a block to which the adaptive loop filter is to be applied.

A reconstructed block having passed through the filter unit 180 may be stored in the reference picture buffer 190.

Figure 2:
FIG. 2 is a block diagram showing a configuration of a decoding apparatus according to an embodiment of the present disclosure.

FIG. 2 is a block diagram showing a configuration of a decoding apparatus according to an embodiment of the present disclosure.

A decoding apparatus 200 may a video decoding apparatus or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may decode the bitstream by using an intra mode or an inter mode. In addition, the decoding apparatus 200 may generate a reconstructed image through decoding and output the reconstructed image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block from an input bitstream and generate a prediction block. When the reconstructed residual block and the prediction block are obtained, the decoding apparatus 200 may generate a reconstructed block that is a decoding target block by adding the reconstructed residual block with the prediction block. The decoding target block may be called a current block.

The entropy decoding unit 210 may generate symbols by entropy decoding the bitstream according to a probability distribution. The generated symbols may include a symbol with a quantized transform coefficient level form. Herein, an entropy decoding method may be similar to the above-described entropy encoding method. For example, an entropy decoding method may be a reverse process of the above-described entropy encoding method.

In order to decode a transform coefficient level, the entropy decoding unit 210 may change a one-dimensional vector form coefficient into a two-dimensional block form through a transform coefficient scanning method. For example, a one-dimensional vector form coefficient may change into a two-dimensional block form by scanning a coefficient of a block using upright scanning. Depending on the size of a transform coefficient block and an intra prediction mode, a vertical scan and a horizontal scan may be used instead of an upright scan. In other words, depending on the size of a transform unit and the intra prediction mode, it may be determined which scan method is to be used among the up-right scan, the vertical scan and the horizontal scan.

A quantized transform coefficient level may be dequantized in the dequantization unit 220 and be inverse-transformed in the inverse-transform unit 230. When a quantized transform coefficient level is quantized and inverse-transformed, a reconstructed residual block may be generated as a result. Herein, the dequantization unit 220 may apply a quantization matrix to the quantized transform coefficient level.

When an intra mode is used, the intra-prediction unit 240 may generate a prediction block by performing spatial prediction that uses a pixel value of a block that is adjacent to a decoding target block and has been already decoded.

When an inter mode is used, the motion compensation unit 250 may generate a prediction block by performing motion compensation that uses a motion vector and a reference image stored in the reference picture buffer 270. When a motion vector does not have an integer value, the motion compensation unit 250 may generate a prediction block by applying an interpolation filter to a partial region within a reference image. In order to perform motion compensation, it is possible to determine which mode, among a skip mode, a merge mode, an advanced motion vector prediction (AMVP) mode, and a current picture referring mode, is used as a motion compensation method of a prediction unit included in the corresponding coding unit. Then, the motion compensation may be performed according to each mode. Herein, the current picture referring mode may refer to a prediction mode using a pre-reconstructed region in a current picture in which a decoding target block is included. To specify the pre-reconstructed region, a motion vector for the current picture referring mode may be used. A flag or an index for indicating whether or not a decoding target block is a block that is encoded in a current picture reference mode may be signaled or inferred through a reference picture index of the decoding target block. In the current picture reference mode, the current picture may exist at a fixed position (for example, the position of refIdx=0 or the last position) in the reference picture list for the block to be decoded. Alternatively, it may be variably located in the reference picture list, and for this purpose, a separate reference picture index indicating the location of the current picture may be signaled A reconstructed residual block and a prediction block may be added through the adder 255. As the reconstructed residual block and the prediction block are added, a generated block may pass through the filter unit 260. The filter unit 260 may apply at least one or more of a deblocking filter, a sample adaptive offset, and an adaptive loop filter to a reconstructed block or a reconstructed image. The filter unit 260 may output the reconstructed image. The reconstructed image may be used for inter-prediction by being stored in the reference picture buffer 270.

Figure 3:
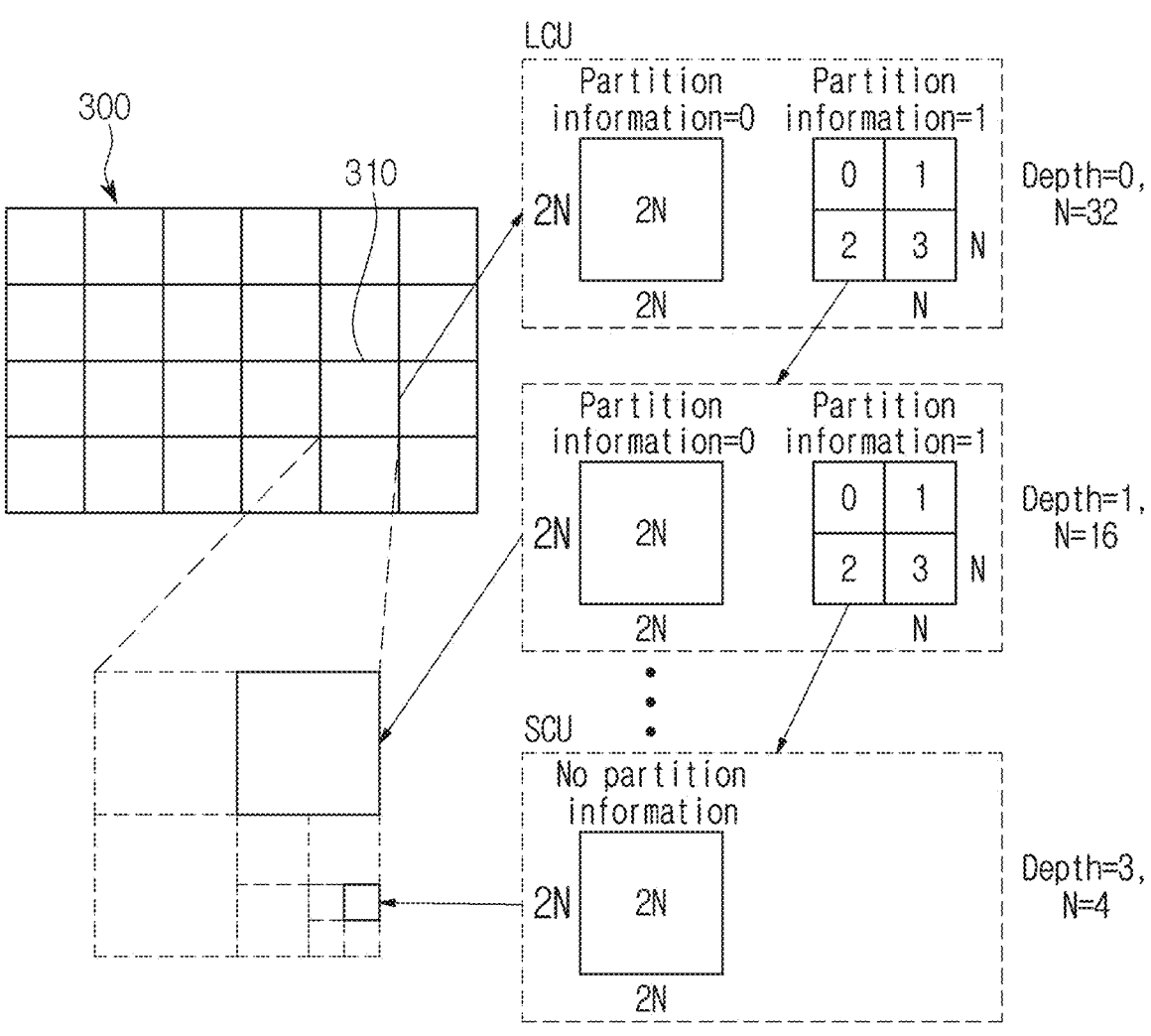
FIG. 3 shows schematically a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, a coding unit (CU) may be used for encoding and decoding. Herein, a coding unit may mean an encoding unit. The term "unit" may collectively refer to a block including 1) a syntax element and 2) an image sample. For example, "unit partitioning" may mean "partitioning a block corresponding to a unit". Information on a unit depth may be included in block partition information. Depth information may represent a number of times or a degree or both in which a unit is partitioned.

Referring to FIG. 3, an image 300 is sequentially partitioned in largest coding units (LCUs), and a partition structure is determined in LCUs. Herein, the LCU may be used in the same meaning as a coding tree unit (CTU). Based on a tree structure, a single unit may have depth information and be hierarchically partitioned. Each partitioned lower unit may have depth information. As the depth information indicates the number and/or a degree of partitioning a unit, it may include information on a size of the lower unit.

A partition structure may mean a distribution of a coding unit (CU) within an LCU 310. CU may be a unit for efficiently encoding an image. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be the half of a horizontal size and a vertical size of the CU before partitioning, or may respectively have sizes smaller than a horizontal size and a vertical size before partitioning according to a number of times of partitioning. A partitioned CU may be recursively partitioned into a multiplicity of CUs with a horizontal size and a vertical size that are decreased in the same manner.

Herein, CU partition may be recursively performed up to a predefined depth. Depth information may be information representing a size of a CU, and may be stored in each CU. For example, a depth of an LCU may be 0, and a depth of a smallest coding unit (SCU) may be a predefined maximum depth. Herein, the LCU may be a coding unit having a largest coding unit size as described above, and the SCU may be a coding unit having a smallest coding unit size.

Partition starts from the LCU 310, when a horizontal size and a vertical size of a CU is decreased by partition, a depth of the CU is increased by 1. At each depth, a CU that is not partitioned may have a size of 2N×2N. In case a CU is partitioned, a CU with a size of 2N×2N may be partitioned into a multiplicity of CUs with a size of N×N. The size of N is halved whenever a depth increases by 1.

For example, when a single coding unit is partitioned into four coding units, a horizontal size and a vertical size of the four partitioned coding units may be a half size of a horizontal and vertical size of: the CU before being partitioned. In one embodiment, when a coding unit having a 32×32 size is partitioned into four coding units, each of the four partitioned coding units may have a 16×16 size. When a single coding unit is partitioned into four coding units, it may mean that the coding unit is partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a 32×32 size is horizontally partitioned into two coding units, each of the two coding units may have a 32×16 size. When a single coding unit is partitioned into two coding units, it may mean that the coding unit is partitioned in a binary-tree form.

Referring to FIG. 3, an LCU with a depth of 0 may have 64×64 pixels. 0 may be a minimum depth. A SCU with a depth of 3 may have 8×8 pixels. 3 may be a maximum depth. Herein, CU of 64×64 pixels, which is an LCU, may be expressed as a depth of 0. CU of 32×32 pixels may be expressed as a depth of 1. CU of 16×16 pixels may be expressed as a depth of 2. CU of 8×8 pixels, which is SCU, may be expressed as a depth of 3.

In addition, information whether or not the CU is partitioned may be represented by using partition information of the CU. The partition information may be 1-bit information. All CUs, except for a SCU, may include partition information. For example, when a value of partition information is a first value, a CU may not be partitioned, and when a value of partition information is a second value, a CU may be partitioned.

Figure 4A:
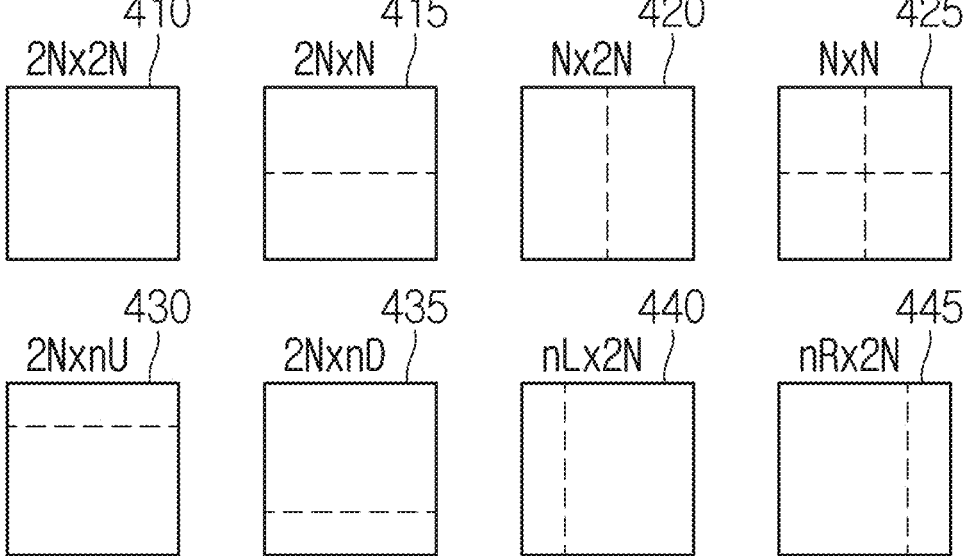
FIG. 4A illustrates a form of a prediction unit that may be included by a coding unit.

FIG. 4A is a view showing a shape of a prediction unit (PU) that a coding unit (CU) may include.

Among CUs that are obtained by partitioning an LCU, a CU incapable of being partitioned any longer may be divided into one or more prediction units (PUs). Such processing may also be referred to as partitioning.

PU may be a basic unit for prediction. PU may be encoded and decoded in any one of a skip mode, an inter-mode and an intra-mode. PU may be partitioned in various forms according to modes.

In addition, a coding unit may not be partitioned into prediction units, and a coding unit and a prediction unit may have a same size.

As illustrated in FIG. 4A, in a skip mode, there may be no partition within a CU. In a skip mode, a 2N×2N mode 410 having a same size as a CU without partition may be provided.

In an inter-mode, eight partition forms within a CU may be provided. For example, in an inter-mode, 2N×2N mode 410, 2N×N mode 415, N×2N mode 420, N×N mode 425, 2N×nU mode 430, 2N×nD mode 435, nL×2N mode 440 and nR×2N mode 445 may be provided. In an intra-mode, 2N×2N mode 410 and N×N mode 425 may be provided.

Coding Tree Unit: may be configured with a single coding tree block of a luma component Y, and two coding tree blocks related to chroma components Cb and Cr. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a pixel block that becomes a process unit when encoding/decoding an image as an input image.

Figure 4B:
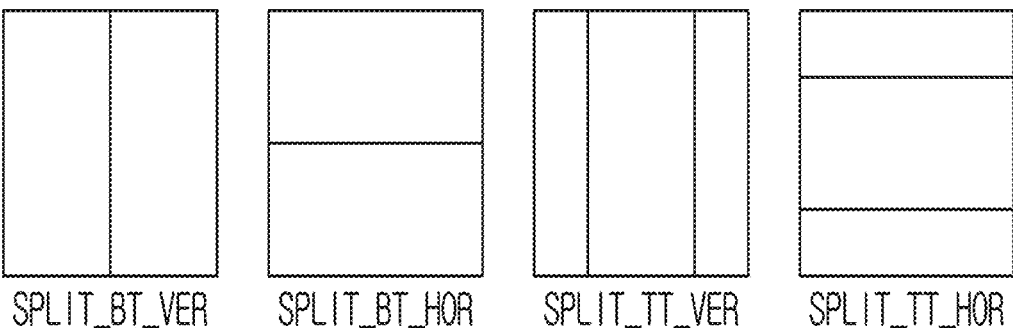
FIG. 4B describes a vertically/horizontally partitioned binary tree and a vertically/horizontally partitioned ternary tree.

FIG. 4B is a view for describing a vertically/horizontally partitioned binary tree and a vertically/horizontally partitioned ternary tree.

Referring to FIG. 4B, in a vertically split binary tree (SPLIT_BT_VER), a horizontally split binary tree (SPLIT_BT_HOR), a vertically split ternary tree (SPLIT_TT_VER) and a horizontally split ternary tree (SPLIT_TT_HOR), each split partition may be encoded as CU, PU and TU. As an example, when one coding block is SPLIT_TT_VER, each of two rectangular partitions may be encoded as CU, PU and TU with a same rectangular shape and same horizontal and vertical sizes.

Coding Tree Block: may be used as a term for designating any one of a Y coding tree block, Cb coding tree block, and Cr coding tree block.

Figure 5:
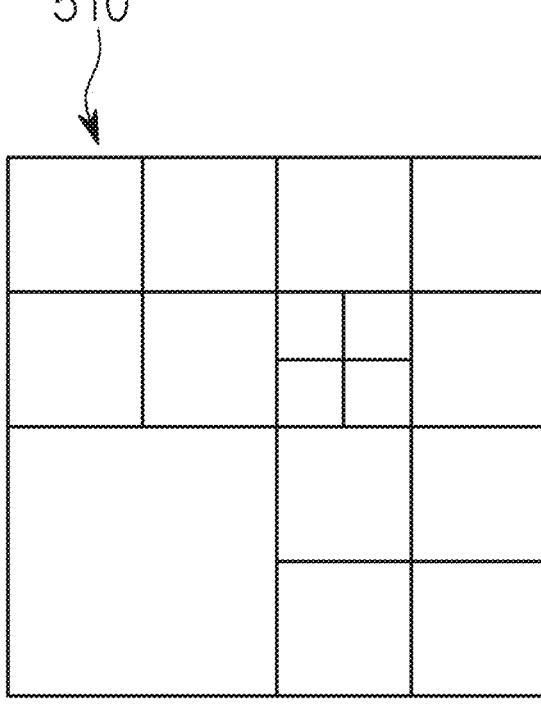
FIG. 5 illustrates a form of a transform unit that may be included by a coding unit.

FIG. 5 is a view showing a shape of a transform unit (TU) that a coding unit (CU) may include.

A transform unit (TU) may be a basic unit that is used for transform, quantization, inverse transform and dequantization within a CU. TU may have a square or rectangular shape. TU may be determined dependent on a size and/or form of CU.

Among CUs that are obtained by partitioning an LCU, a CU that is not partitioned into CUs any longer may be partitioned into one or more TUS. Herein, a partition structure of a TU may be a quad-tree structure. For example, as illustrated in FIG. 5, a single CU 510 may be partitioned once or more times according to a quad-tree structure. In case a single CU is partitioned once or more times, it may mean that the CU is recursively partitioned. Through partition, a single CU 510 may be composed of TUs with various sizes. Alternatively, based on the number of vertical lines and/or horizontal lines partitioning a CU, the CU may be partitioned into one or more TUS. A CU may be partitioned into a symmetrical TU or an asymmetrical TU. For partition into an asymmetrical TU, information on a size/form of a TU may be signaled, and it may be derived from information on a size/form of a CU.

In addition, a coding unit may not be partitioned into a transform unit, and a coding unit and a transform unit may have a same size.

The size and/or form of a coding tree unit (CTU) may have a square form with the width×height size of 2N×2N. For example, a CTU may have a 128×128 size, a 64×64 size or a 32×32 size. However, the present disclosure is not limited to the embodiment. A CTU may have a coded tree block (CTB) corresponding to a luma sample and a CTB corresponding to a chroma (color) sample. Herein, the number of CTUs may be the same as the number of CTBs of the luma sample.

A single picture may be partitioned into at least one slice. Herein, any slice thus partitioned may be composed of at least one CTU. A slice may have any form. As an example, a single slice may have a square and/or rectangular form composed of one or more CTUs. However, the present disclosure is not limited to the embodiment, and a slice may have various forms.

Herein, when a single picture is partitioned into at least one slice, if every partitioned slice has a rectangular and/or square form, it may be defined that the picture has been partitioned into rectangular slices.

In addition, when a single picture is partitioned into at least one slice, if at least one slice among all the partitioned slices does not have a rectangular and/or square form, it may be defined that the picture has been partitioned into raster-scan slices. As an example, when a single picture is composed of a plurality of tiles, a tile in the picture may be configured according to a tile raster scan order within any raster scan slice.

A single picture and/or slice may be partitioned into at least one tile. Herein, any tile thus partitioned may be composed of at least one CTU. A tile may have any form. As an example, a single tile may have a square and/or rectangular form composed of one or more CTUS. However, the present disclosure is not limited to the embodiment.

When a rectangular slice or a raster scan slice or both are composed of at least one tile, each tile may be partitioned into at least one brick. Herein, any brick thus partitioned may be composed of a CTU row constituting a tile. Herein, a vertical size of the brick may be greater than or equal to a vertical size of a single CTU and/or CTB.

In addition, when a single tile is not partitioned into bricks, the tile may be considered as a single brick. On the other hand, when a single tile is partitioned into a plurality of bricks, a random brick partitioned from the tile may not be considered as tile.

An index idx indicating at least one tile and/or brick may always begin from 0.

According to the above-described definitions of slice, tile and brick, a single slice may be composed of a single tile and/or brick or be composed of a plurality of tiles and/or bricks. Herein, the slice is composed of a plurality of tiles and/or bricks, each brick may be encoded/decoded according to a brick raster scan order within a slice including a picture and/or the brick.

Unlike the above example, each of a plurality of tiles and/or bricks constituting a picture may be defined as a single slice. Alternatively, a single tile may be partitioned into a plurality of slices and a slice thus obtained may be partitioned into a plurality of bricks.

Figure 6:
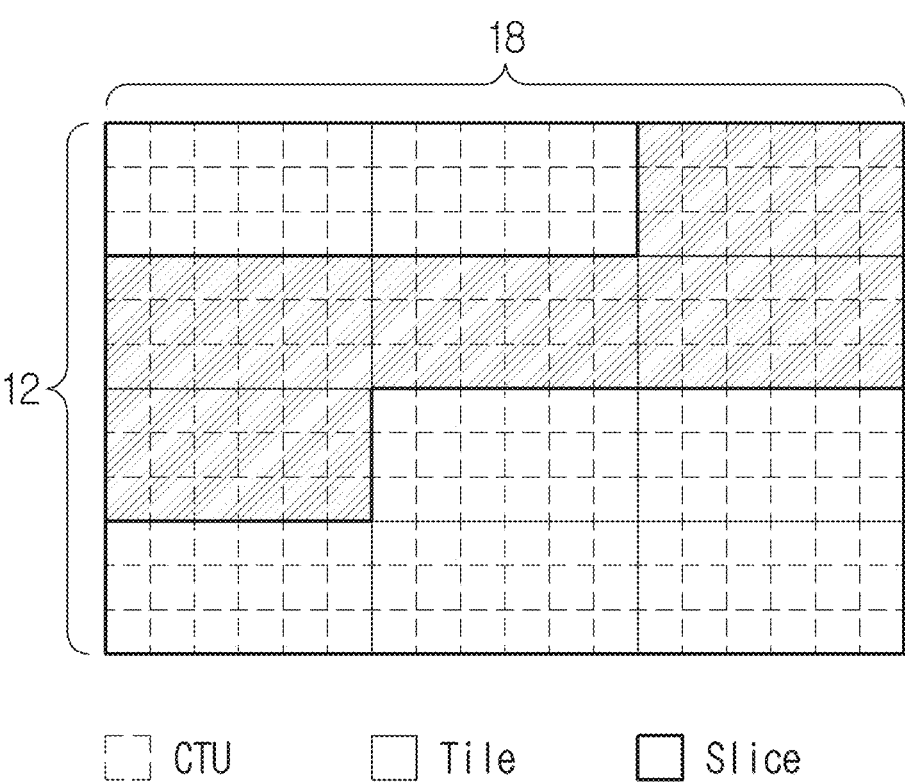
FIG. 6 describes slices, tiles and CTUs (Coding Tree Units) constituting a picture according to an embodiment of the present disclosure.

FIG. 6 is a view for describing slices, tiles and CTUS constituting a picture according to an embodiment of the present disclosure.

Referring to FIG. 6, when a single picture is composed of 18 CTUS horizontally and 12 CTUs vertically, the picture may be composed of 3 raster scan slices and 12 tiles.

Figure 7:
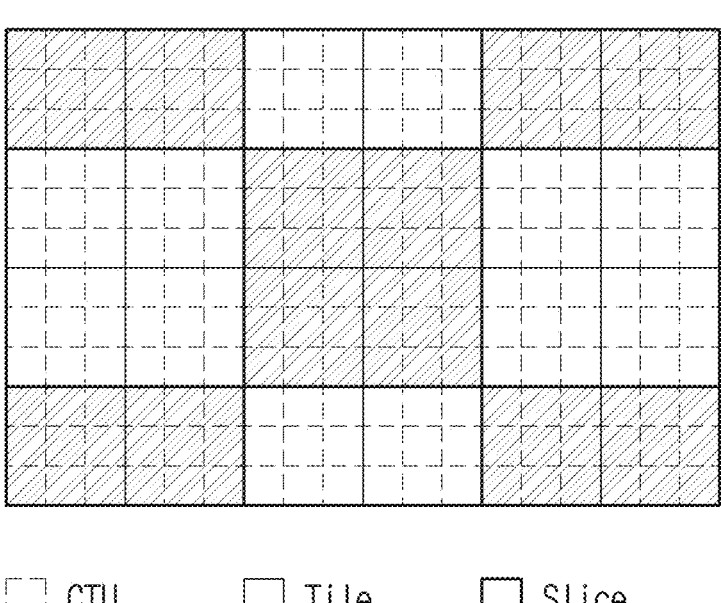
FIG. 7 describes slices, tiles and CTUs constituting a picture according to another embodiment of the present disclosure.

FIG. 7 is a view for describing slices, tiles and CTUS constituting a picture according to another embodiment of the present disclosure.

Referring to FIG. 7, when a single picture is composed of 18 CTUs horizontally and 12 CTUs vertically, the picture may be composed of 9 rectangular slices and 24 tiles.

Figure 8:
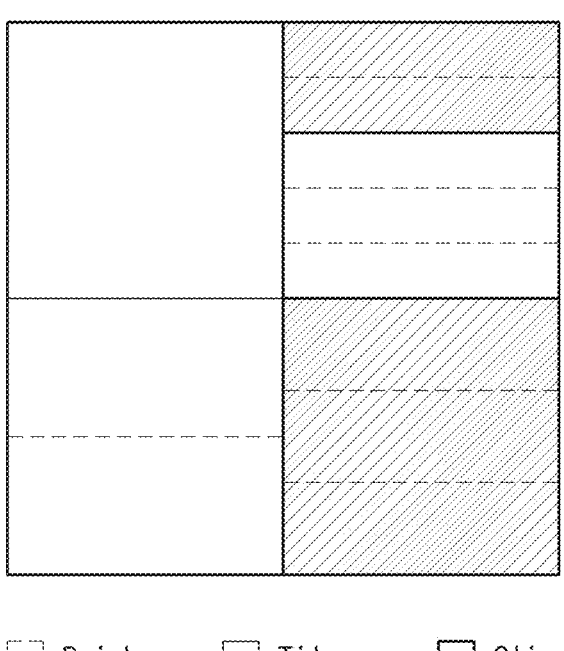
FIG. 8 describes slices, tiles and CTUs constituting a picture according to another embodiment of the present disclosure.

FIG. 8 is a view for describing slices, tiles and CTUS constituting a picture according to another embodiment of the present disclosure.

Referring to FIG. 8, a single picture may be composed of 4 tiles, and a top-left tile may be simply considered as a brick. In addition, a top-right tile may be composed of 2 slices and each slice may be partitioned into 2 bricks and 3 bricks, thereby being partitioned into 5 bricks. In addition, a bottom-left tile may be composed of 2 bricks, and a bottom-right tile may be composed of 3 bricks.

More specifically, a single picture may be composed of 4 tiles, 11 bricks and 4 rectangular slices. Information for signaling a partition structure of the picture composed of slice, tile and brick may be transmitted from an encoder to a decoder by using at least one of a sequences parameter set (SPS), a picture parameter set (PPS), a video parameter set (VPS), supplemental enhancement information (SEI), a slice header, and a tile group header.

FIG. 9 is a view for describing slices, tiles and CTUS constituting a picture according to another embodiment of the present disclosure.

Referring to FIG. 9, when it is assumed that a size of CTU is 128×128 in a picture with 1,920×1,080 horizontal and vertical resolution, the picture may be composed of a total 15 CTUs horizontally and a total of 9 CTUs vertically. Herein, the picture may be composed of 2 rectangular slices, 12 tiles (6 tiles for each slice) and 15 bricks. In addition, a partition structure of a picture may be signaled using a picture parameter set.

The reason why the picture is composed of 15 bricks is that 3 tiles located at the rightmost column of the picture are partitioned into 2 bricks respectively and all the remaining tiles are considered as a single brick. Accordingly, the total number of bricks in the picture may be 15.

A number specified in each CTU within a picture may correspond to an order in which CTUs belonging to a slice and/or a tile are actually encoded/decoded according to a raster scan method. For example, the numbers 0 to 9 specified in CTUs within a first tile of a first slice in a picture may correspond to an order in which the CTUs are encoded/decoded according to raster scan.

FIG. 10 is a view for describing a method (syntax) by which the picture partition information of FIG. 9 is signaled through PPS according to an embodiment of the present disclosure.

Referring to FIG. 10, information (e.g., single_tile_in_pic_flag) indicating whether or not a current picture is composed of a single tile may be transmitted. For example, as FIG. 9 corresponds to a case where a picture is partitioned into a plurality of tiles, information (e.g., single_tile_in_pic_flag) indicating whether or not a current picture is composed of a single tile may represent 0.

When a current picture is composed of a plurality of tiles, information (e.g. single_tile_in_pic_flag) indicating whether or not the current picture is composed of a single tile may represent 0, and configuration information of the plurality of tiles constituting the picture may be transmitted. Herein, information (e.g. uniform_tile_spacing_flag) indicating whether or not a plurality of tiles have a rectangular and/or square form with uniform horizontal and vertical sizes may be transmitted. For example, as FIG. 9 is a case in where tiles have different sizes, information (e.g. uniform_tile_spacing_flag) indicating whether or not a plurality of tiles have a rectangular and/or square form with uniform horizontal and vertical sizes may represent 0.

When a plurality of tiles have a rectangular and/or square form with a uniform horizontal and/or vertical size, that is, when information (e.g. uniform_tile_spacing_flag) indicating whether or not a plurality of tiles have a rectangular and/or square form with a uniform horizontal and/or vertical size corresponds to 1, the horizontal and vertical sizes of tile may be transmitted. Herein, information indicating the horizontal size of transmitted tile (e.g., tile_cols_width_minus1) and/or information indicating the vertical size of transmitted tile (e.g., tile_rows_height_minus1) may represent (number of CTBs-1). Exceptionally, tiles located on the right and/or bottom may not have a horizontal size and/or vertical size of signaled tile due to a size of picture.

When a plurality of tiles do not have a rectangular and/or square form with a uniform horizontal and/or vertical size, that is, when information (e.g. uniform_tile_spacing_flag) indicating whether or not plurality of tiles have a rectangular and/or square form with a uniform horizontal and/or vertical size is 0, the number of columns and/or the number of rows of tiles constituting a current picture may be transmitted. Herein, information indicating the number of tile columns of (e.g., num_tile_columns_minus1) and information indicating the number of rows of tile (e.g., num_tile_rows_minus1) may be transmitted. For example, FIG. 9 is a case in which a picture is composed of a total of 12 (4×3) tiles with 4 columns and 3 rows. In this case, information indicating the number of columns of tile (e.g., num_tile_columns_minus1) may represent 3, and information indicating the number of rows of tile (e.g., num_tile_rows_minus1) may represent 2.

Next, information indicating a column size of each tile (e.g., tile_column_width_minus1[i]) and information indicating a row size of each tile (e.g., tile_row_height_minus1[i]) may be transmitted. Herein, i may be defined as an index of tile column and row, and information indicating a column size of each tile (e.g., tile_column_width_minus1[i]) may be represented as a horizontal size of i-th tile column (Number of CTB-1). In addition, likewise, information indicating a row size of each tile (e.g., tile_row_height_minus1[i]) may represent a vertical size of i-th tile row as (Number of CTBs-1).

FIG. 11 is a view for describing partitioning of tiles in a picture according to the signaling of FIG. 10 in accordance with an embodiment of the present disclosure.

Referring to FIG. 11, information indicating whether or not at least one tile is partitioned into bricks (e.g., brick_splitting_present_flag) may be signaled. As an example, when tiles with index 3, 7 and 11 among 12 tiles of FIG. 11 are partitioned into bricks, information indicating whether or not at least one tile is partitioned into bricks (e.g., brick_splitting_present_flag) may represent 1.

When at least one tile is partitioned into bricks, information indicating whether or not at least one tile is partitioned into bricks (e.g., brick_splitting_present_flag) may represent 1. In addition, when a tile is partitioned with a uniform size, that is, when information indicating whether or not a plurality of tiles have a rectangular and/or square form with uniform horizontal and vertical sizes (e.g., uniform_tile_spacing_flag) is 1, a tile size of a current picture may be explicitly signaled through information indicating the number of tiles in the current picture (e.g., num_tiles_in_pic_minus1).

Information indicating whether or not all the tiles partitioned in a current picture are partitioned into bricks respectively (e.g., brick_split_flag[i]) may be signaled. Herein, like the numbers shown in FIG. 11, i may represent an index in a raster scan order of tiles partitioned in a current picture. As an example, the tiles with indexes 3, 7 and 11 in FIG. 11 are partitioned into bricks, information indicating whether or not the tile with index 3 is partitioned into bricks (e.g., brick_split_flag[3]), information indicating whether or not the tile with index 7 is partitioned into bricks (e.g., brick_split_flag[7]), and information indicating whether or not the tile with index 11 is partitioned into bricks (e.g., brick_split_flag[11]) may represent commonly 1.

When a vertical size of any i-th tile is defined as RowHeight[i], if RowHeight[i] has a same size as a vertical size of one CTB (RowHeight[i]==12), since the tile is not capable of being partitioned into bricks, information indicating whether or not it is partitioned into bricks (e.g., brick_split_flag) may not be explicitly transmitted but be implicitly inferred in a decoder.

When any i-th tile is partitioned into bricks, information indicating whether or not the i-th tile is partitioned into bricks (e.g., brick_split_present_flag[i]) may represent 1. In addition, when the size of RowHeight[i] of the tile is twice a vertical size of CTB (RowHeight[i]==2), the tile may be uniformly partitioned into two bricks, and a vertical size of the brick may be 1 (the vertical size of CTB). Accordingly, information indicating whether or not a vertical size of brick in the tile is uniformly partitioned (e.g., uniform_brick_spacing_flag[i]) and/or information indicating the vertical size of the brick (e.g., brick_height_minus1[i]) may be implicitly inferred in a decoder.

When i-th tile is partitioned into at least N bricks, that is, when information indicating whether or not the i-th tile is partitioned into bricks (e.g., brick_split_flag[i]) is 1, information indicating whether or not a vertical size of brick in the tile is uniformly partitioned (e.g., uniform_brick_spacing_flag[i]) may be signaled. Herein, N may be a positive integer greater than 0. For example, N may have a value of 3.

When i-th tile is partitioned into bricks with a uniform vertical size, that is, information indicating whether or not a vertical size of brick in the tile is uniformly partitioned (e.g., uniform_brick_spacing_flag[i]) is 1, the uniform vertical size of brick may be signaled through information indicating the vertical size of the brick (e.g., brick_height_minus1[i]). Herein, the information indicating the vertical size of the brick (e.g., brick height minus1[i]) may represent (Number of CTB−1).

When i-th tile is partitioned into bricks with different vertical sizes, that is, information indicating whether or not a vertical size of brick in the tile is uniformly partitioned (e.g., uniform_brick_spacing_flag[i]) is 0 information indicating the number of a plurality of bricks partitioned in the tile (e.g., num_brick_rows_minus1[i]) and information indicating a vertical size of each brick (e.g, brick_row_height_minus1[i][j]) may be signaled. Herein, the information indicating the vertical size of each brick (e.g., brick rwo_height_minus1[i][j]) may represent (Number of CTB 1), and j may represent j-th brick of i-th brick.

As an example, when the tile indexes 3 and 7 in FIG. 9 are partitioned into two bricks with different vertical sizes, information indicating the number of a plurality of bricks partitioned in the tile with index 3 (e.g., num_brick_rows_minus1[3]) and information indicating the number of a plurality of bricks partitioned in the tile with index 7 (e.g., num_brick_rows_minus1[7]) may represent 1. In addition, information indicating a vertical size of a first brick in a tile with index 3 (e.g., brick_row_height_minus1[3] [0]) and information indicating a vertical size of a first brick in a tile with index 7 (e.g., brick_row_height_minus1[7][0]) may represent 1. In addition, as a total number of bricks is 2, the vertical size of a second brick may be implicitly inferred without separate signaling.

As an example, when the tile index 11 in FIG. 9 is partitioned into two bricks with different vertical sizes, information indicating the number of a plurality of bricks partitioned in the tile with index 11 (e.g., num_brick_rows_minus1) may represent 1. In addition, information indicating the vertical size of a first brick of the tile with index 11 (e.g., brick_row_height_minus1[0]) may represent 0. Since a total number of bricks is 2, the vertical size of a second brick may be implicitly inferred without separate signaling.

FIG. 12 describes a method (syntax) by which partition information of a brick is signaled through PPS according to an embodiment of the present disclosure.

Figures 13, 14:
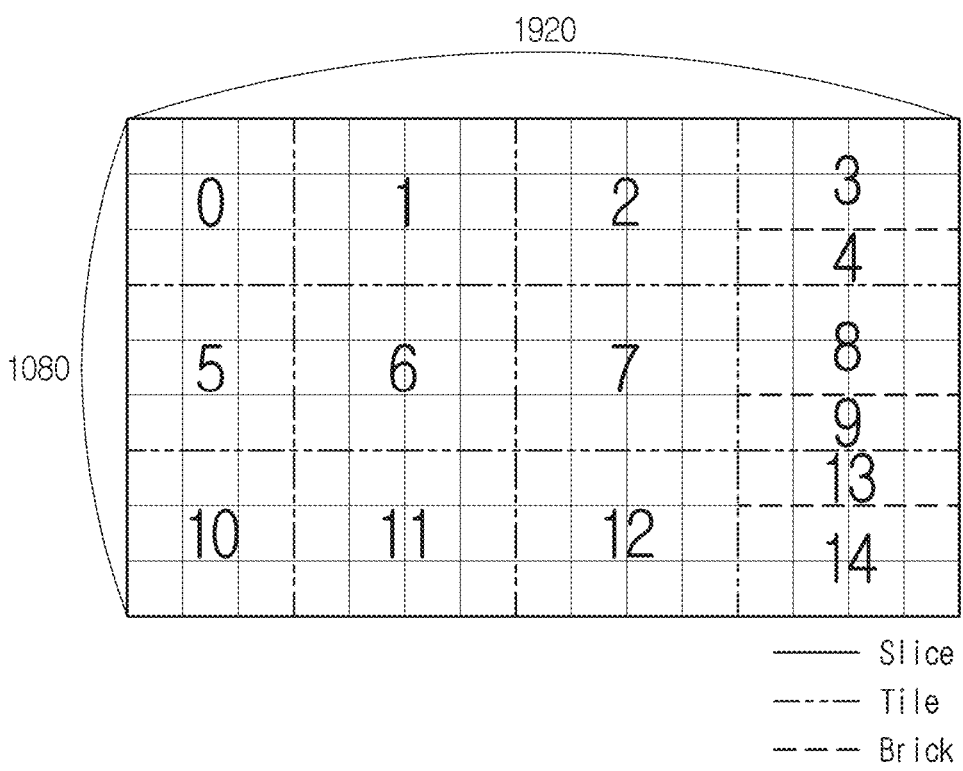
FIG. 13 describes partitioning into a plurality of tiles and/or bricks according to the signaling of FIG. 10 and FIG. 12 in accordance with an embodiment of the present disclosure.
FIG. 14 describes a method (syntax) by which partition information of a slice is signaled through PPS according to an embodiment of the present disclosure.

FIG. 13 describes partitioning into a plurality of tiles and/or bricks according to the signaling of FIG. 10 and FIG. 12 in accordance with an embodiment of the present disclosure.

Referring to FIG. 13, a single tile may be considered as a single brick. Accordingly, a current picture may be considered to have been partitioned into a total of 15 bricks. Herein, an index (brick_idx) in a raster scan order of bricks partitioned in a current picture may represent a number shown in FIG. 13.

FIG. 14 describes a method (syntax) by which partition information of a slice is signaled through PPS according to an embodiment of the present disclosure.

Figure 15:
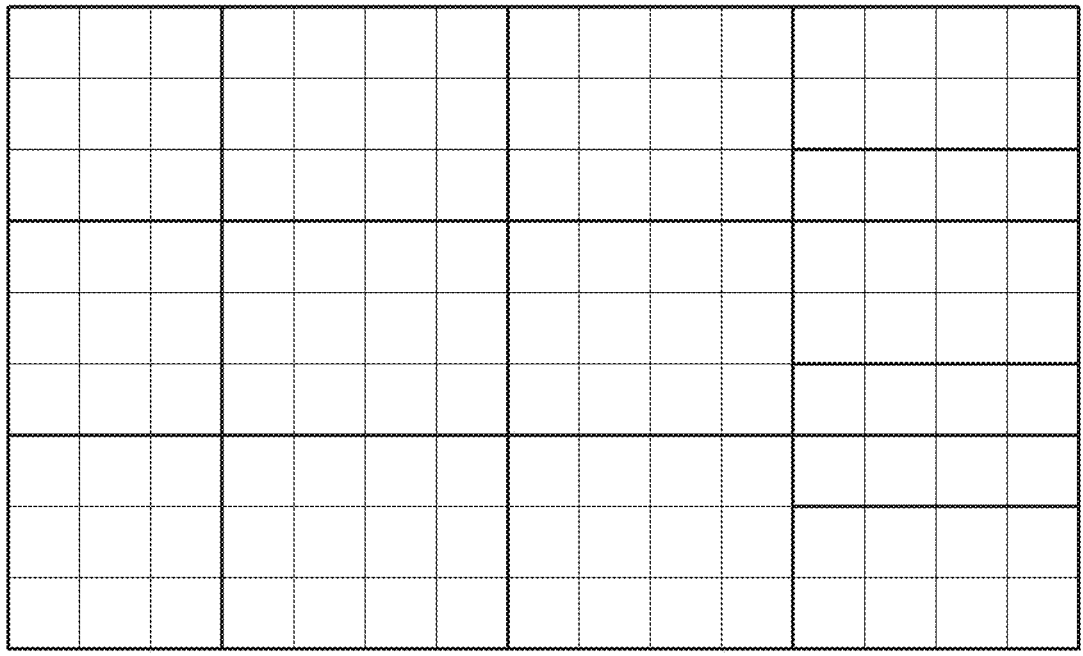
FIG. 15 describes a brick composed of 15 rectangular slices in a current picture according to an embodiment of the present disclosure.

FIG. 15 describes a brick composed of 15 rectangular slices in a current picture according to an embodiment of the present disclosure.

Referring to FIG. 15, information indicating whether or not each of all the bricks partitioned as in FIG. 13 may be composed of a single slice (e.g., single_brick_per_slice_flag) may be signaled. When information indicating whether or not each of all the partitioned bricks may be composed of a single slice (e.g., single_brick_per_slice_flag) is 1, it may be signaled that 15 bricks in a current picture as in FIG. 15 may be composed of 15 rectangular slices.

When information indicating whether or not each of all the partitioned bricks may be composed of a single slice (e.g., single_brick_per_slice_flag) is 0, information indicating whether or not a slice of a current picture is a rectangular slice (e.g., rect_slice_flag) may be signaled.

When information indicating whether or not a slice of a current picture is a rectangular slice (e.g., rect_slice_flag) is 1 and a single slice is composed of at least two bricks, information indicating a value obtained by subtracting 1 from a total number of slices included in the current picture (e.g., num_slices_in_pic_minus1) may be signaled. Accordingly, a total number of slices included in a current picture may be transmitted.

For each of a plurality of slices, information indicating a difference value of bottom_right_brick_idx between the i-th slice and the i–1th slice constituting a current picture (e.g., bottom_right_brick_idx_delta[i]) may be transmitted by using an index in a raster scan order of bricks partitioned in the current picture defined in FIG. 13. However, in the case of a first slice (i==0), that is, bottom_right_brick_idx_delta [0], the bottom_right_brick_idx value itself of the first slice may be transmitted.

Herein, information indicating whether bottom_right_brick_idx_delta[i] is a positive number or a negative number (e.g., brick_idx_delta_sign_flag[i]) may be signaled. As an example, when brick_idx_delta_sign_flag[i] of i-th slice is 1, bottom_right_brick_idx_delta[i] may be determined as a positive number.

As an example, since the bottom_right_brick_idx value of a first slice is transmitted itself, bottom_right_brick_idx_delta[0] of the first slice may always have a positive value. Accordingly, without necessity of explicitly signaling brick_idx_delta_sign_flag[0] in an encoder, it may be implicitly inferred that brick_idx_delta_sign_flag[0] of the first slice becomes 1 in a decoder.

In the case of a last slice, since bottom_right_brick_idx has the biggest value among all brick_idx values, brick_idx_delta_sign_flag always has a positive value. Accordingly, brick_idx_delta_sign_flag information of a last slice may not be explicitly transmitted but may be implicitly inferred as 1 in a decoder.

When a decoder knows bottom_right_brick_idx of a last slice and bottom_right_brick_idx_delta of an immediate previous slice is parsed, the decoder may know bottom_right_brick_idx value of the immediate previous slice. Accordingly, bottom_right_brick_idx_delta information of the last slice may not be explicitly transmitted but may be implicitly inferred in the decoder.

Figures 16, 17:
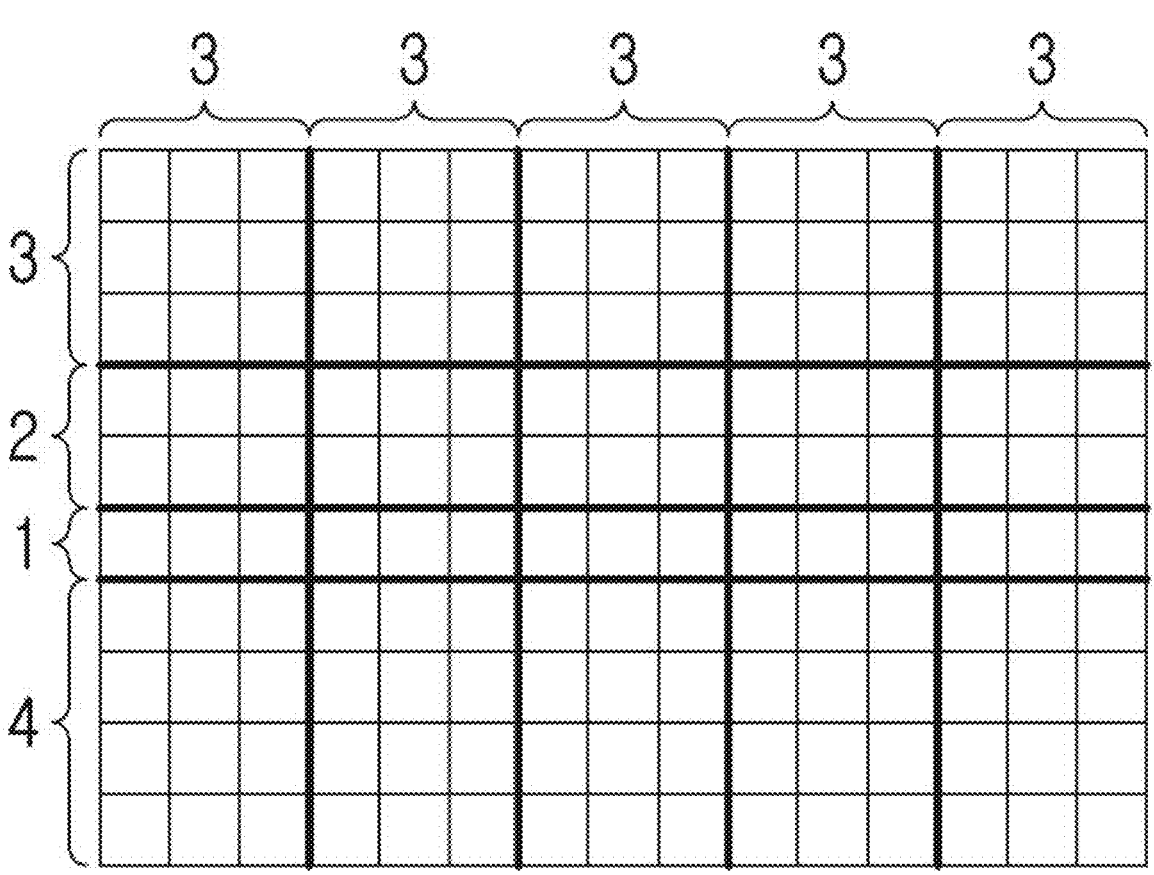
FIG. 16 describes tiles constituting a picture according to an embodiment of the present disclosure.
FIG. 17 describes a method (syntax) by which tile information in a picture is signaled through PPS according to an embodiment of the present disclosure.

FIG. 16 describes tiles constituting a picture according to an embodiment of the present disclosure. A single picture may be partitioned into one or more subpictures. Herein, the subpicture may be defined as a rectangular form composed of at least one slice in a single picture. As an example, a single picture or subpicture may be partitioned into one or more tile columns and/or one or more tile rows. Herein, a tile column and/or a tile row may be defined as a rectangular form consisting of one or more tiles. As an example, a single picture or subpicture may be partitioned into one or more slices.

Herein, a slice may be partitioned into raster scan slices or rectangular slices. However, the present disclosure is not limited to the embodiment above. A tile and/or a slice may be composed of one or more CTBs. A single tile may be partitioned into one or more slices and/or subpictures. In addition, a single slice may be partitioned into one or more tiles and/or subpictures. A total number of split tiles may be equal to the product of the number of tile columns and the number of tile rows.

Referring to FIG. 16, a single picture and/or a single subpicture may be partitioned into one or more tiles. The number of tile columns may be 5, and the number of tile rows may be 4. The width of each of 5 tile columns may be composed of 3 CTBs. Accordingly, the width of each tile column may correspond to a value of 3. When encoding a tile within a picture, the tile column width may be transmitted once without sending repeatedly the tile column width. Accordingly, since every tile column width is 3, the number of tile column widths to be transmitted may be 1. The height of a tile row may correspond to 3, 2, 1 and 4 in tiles with indexes 0 to 3 respectively. Accordingly, the number of tile row heights to be transmitted may correspond to 3.

Information indicating the number of tile column widths to be transmitted (e.g, num_exp_tile_columns_minus1) may be signaled. Accordingly, information indicating the number of tile column widths to be transmitted (e.g, num_exp_tile_columns_minus1) may indicate 0. In addition, information indicating the width of a tile column (e.g., tile_column_width_minus1[i]) may be signaled. Information indicating the width of a tile column with index 0 (e.g., tile_column_width_minus1[0]) may indicate 2. Information indicating the width of a tile column with index 0 (e.g., tile_column_width_minus1[0]) may be equally used for the widths of the remaining tile columns with indexes 1 to 4. In addition, a width of a last tile column existing on a boundary may be inferred through a width of a picture and/or a subpicture. In addition, the last tile column on the boundary may be implicitly inferred like a variable (e.g., colWidth[i]) storing a width of tile column of FIG. 18. Herein, the index may represent an index for a tile column. An index may have a value from 0 to the number of tile columns−1.

Information indicating the number of tile row heights to be transmitted (e.g, num_exp_tile_rows_minus1) may be signaled. Accordingly, information indicating the number of tile row heights to be transmitted (e.g, num_exp_tile_r ows_minus1) may indicate 2. In addition, information indicating the height of a tile row (e.g., tile_row_height_minus1 [i]) may be signaled. Information indicating the height of a tile row with index 0 (e.g., tile_row_height_minus1[0]) may indicate 2. In addition, information indicating the height of a tile row with index 1 (e.g., tile_row_height_minus1[1]) may indicate 1. In addition, information indicating the height of a tile row with index 2 (e.g., tile_row_height_mi-nus1[2]) may indicate 0. A height of a last tile row existing on a boundary may be inferred through a height of a picture and/or a subpicture. In addition, the last tile row on the boundary may be implicitly inferred like a variable (e.g., RowHeight[i]) storing a width of tile row of FIG. 19. Herein, the index may represent an index for a tile row. An index may have a value from 0 to the number of tile rows−1.

As an example, unlike FIG. 16, when there are 5 tile columns and the widths of each tile column are 3, 3, 2, 2 and 2 respectively, the number of tile column widths to be transmitted may be 3. Accordingly, information indicating the number of tile column widths to be transmitted (e.g, num_exp_tile_columns_minus1) may indicate 2. Informa-tion indicating the width of a tile column with index 0 (e.g., tile_column_width_minus1[0]) may indicate 2. In addition, information indicating the width of a tile column with index 1 (e.g., tile_column_width_minus1[1]) may indicate 2. In addition, information indicating the width of a tile column with index 2 (e.g., tile_column_width_minus1[2]) may indi-cate 1. Information indicating the width of a tile column with index 2 (e.g., tile_column_width_minus1[2]) may be equally used for the widths of the remaining tile columns with indexes 3 and 4. A width of a last tile column existing on a boundary may be inferred through a width of a picture and/or a subpicture. In addition, it may be implicitly inferred like a variable (e.g., colWidth[i]) storing a width of tile column of FIG. 18. Herein, the index may represent an index for a tile column. An index may have a value from 0 to the number of tile columns−1. However, the present disclosure is not limited to the embodiment above.

As an example, unlike FIG. 16, when there are 5 tile columns and the widths of each tile column are 3, 4, 5, 4 and 3 respectively, the number of tile column widths to be transmitted may be 4. Accordingly, information indicating the number of tile column widths to be transmitted (e.g, num_exp_tile_columns_minus1) may indicate 3. Informa-tion indicating the width of a tile column with index 0 (e.g., tile_column_width_minus1[0]) may indicate 2. In addition, information indicating the width of a tile column with index 1 (e.g., tile_column_width_minus1[1]) may indicate 3. In addition, information indicating the width of a tile column with index 2 (e.g., tile_column_width_minus1[2]) may indi-cate 4. In addition, information indicating the width of a tile column with index 3 (e.g., tile_column_width_minus1[3]) may indicate 3. A width of the remaining tile column with index 4, that is, of the tile column existing on a picture boundary may be inferred through a width of a picture and/or a subpicture. In addition, it may be implicitly inferred like a variable (e.g., colWidth[i]) storing a width of tile column of FIG. 18. Herein, the index may represent an index for a tile column. An index may have a value from 0 to the number of tile columns−1. However, the present disclosure is not limited to the embodiment above.

FIG. 17 describes a method (syntax) by which tile infor-mation in a picture is signaled through PPS according to an embodiment of the present disclosure.

Referring to FIG. 17, information indicating the width of a tile column (e.g., tile_column_width_minus1[i]) may be transmitted only when information indicating the number of tile column widths to be transmitted (e.g., num_exp_tile_columns_minus1) exceeds 0. When information indicating the number of tile column widths to be transmit-ted (e.g, num_exp_tile_columns_minus1) is 0, a current picture and/or subpicture may be composed of a single tile. Accordingly, information indicating the width of a tile column (e.g., tile_column_width_minus1[i]) may be inferred through the width of a current picture and/or subpicture.

When a current picture is a single tile, the width of the picture (tile) may be transmitted through information indi-cating the width of a picture of PPS (e.g., pic_width_in_lu-ma_samples). CtbSizeY, which is a size of CTU(CTB), may be inferred through CtbLog 2SizeY=sps_log 2_ctu_size_mi-nus5+5 or CtbLog 2SizeY=pps_log 2_ctu_size_minus5+5. In addition, it may be inferred through CtbSizeY=1<<CtbLog 2SizeY. Information indicating the width of a tile column with index 0 (e.g., tile_col-umn_width_minus1[0]) may be inferred by modulo or by dividing information indicating the width of a picture (e.g., pic_width_in_luma_samples) by CtbSizeY.

Information indicating the height of a tile row (e.g., tile row height minus1[i]) may be transmitted only when infor-mation indicating the number of tile row heights to be transmitted (e.g., num_exp_tile_rows_minus1) exceeds 0. When information indicating the number of tile row heights to be transmitted (e.g, num_exp_tile_rows_minus1) is 0, a current picture and/or subpicture may be composed of a single tile. Accordingly, information indicating the height of a tile row (e.g., tile_row_height_minus1[i]) may be inferred through the height of a current picture and/or subpicture.

When a current picture is a single tile, the height of the picture (tile) may be transmitted through information indi-cating the height of a picture of PPS (e.g., pic_height_in_lu-ma_samples). CtbSizeY, which is a size of CTU (CTB), may be inferred through CtbLog 2SizeY=sps_log 2_ctu_size_mi-nus5+5 or CtbLog 2SizeY=pps_log 2_ctu_size_minus5+5. In addition, it may be inferred through CtbSizeY=1<<CtbLog 2SizeY. Information indicating the height of a tile row with index 0 (e.g., tile_row_height_mi-nus1[0]) may be inferred by modulo or by dividing infor-mation indicating the height of a picture (e.g., pic_height_in_luma_samples) by CtbSizeY.

FIG. 18 describes a method (syntax) by which width information of a tile column in a picture is signaled accord-ing to an embodiment of the present disclosure.

FIG. 19 describes a method (syntax) by which height information of a tile row in a picture is signaled according to an embodiment of the present disclosure.

Figure 20:
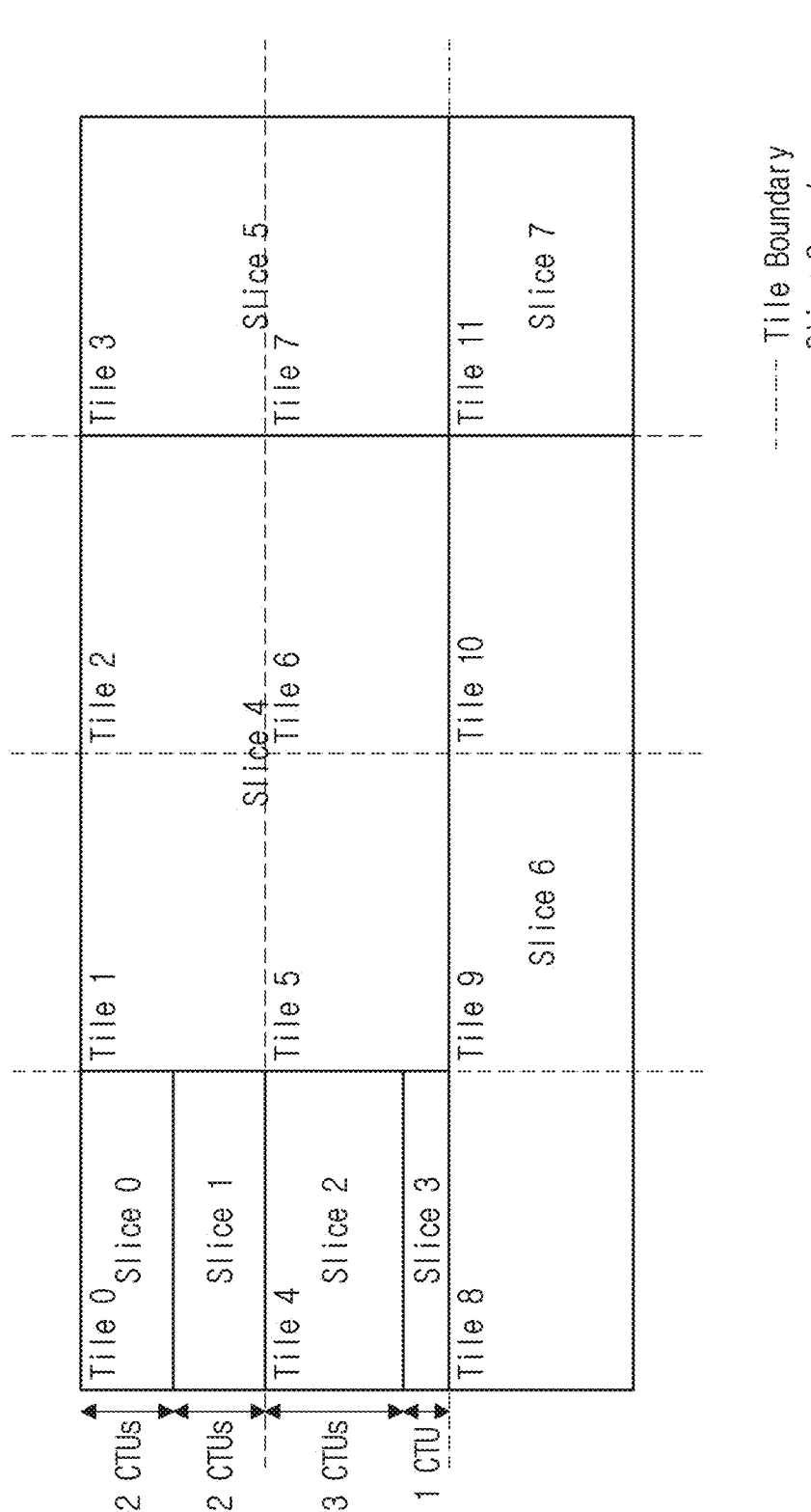
FIG. 20 describes slices and tiles constituting a picture according to an embodiment of the present disclosure.

FIG. 20 describes slices and tiles constituting a picture according to an embodiment of the present disclosure. A single picture and/or subpicture may be partitioned into one or more tiles. In addition, raster scan and/or rectangular slice partition information may be signaled by using tile partition information. Tile partition information may be defined as a tile index. A single tile may be partitioned into one or more slices. In a slice included in a current picture and/or sub-picture, information indicating whether or not it is a rect-angular slice (e.g., rect_slice_flag) may be signaled. In addition, information indicating a total number of slices included in a current picture and/or subpicture (e.g., num_slice_in_pic_minus1) may be signaled. In addi-tion, when a single tile is partitioned into one or more slices, information indicating a horizontal size of slice (e.g., slice_width_in_tiles_minus1) and information indicating a vertical size of slice (e.g., slice_height_in_tiles_minus1) may indicate 0. Herein, information indicating the number of slices partitioned within a tile (e.g., num slices in minus1) may be transmitted.

Referring to FIG. 20, Slice 4 may be partitioned into 4 tiles: Tile 1, Tile 2, Tile 5 and Tile 6. The horizontal and vertical sizes of Slice 4 may be indicated by the number of tile units. The slice width and height of Slice 4 may be partitioned into 2 tiles. Accordingly, information indicating a slice width of Slice 4 (e.g., slice_width_in_tiles_minus1) may indicate 1. Information indicating a slice height of Slice 4 (e.g., slice_height_in_tiles_minus1) may indicate 1.

Tile 0 and Tile 4 may be partitioned into 2 slices respec-tively. In slices of Tile 0 and Tile 4, information indicating a horizontal size of slice (e.g., slice_width_in_tiles_minus1) and information indicating a vertical size of slice (e.g., slice_height_in_tiles_minus1) may indicate 0. Also, in Tile 0 and Tile 4, information indicating the number of slices partitioned within a tile (e.g., num_slices_in_minus1) may indicate 1.

When information indicating the number of slices parti-tioned within a tile (e.g., num slices in minus1) is equal to or greater than 1, a current tile may be partitioned into at least two slices. Herein, information indicating a slice height (e.g., slice_height_in_ctu_minus1) may be transmitted the number of slices-1 times. In addition, the height of a last slice may be implicitly inferred through the height of a current tile. In the case of Tile 0, information indicating a slice height (e.g., slice_height_in_ctu_minus1) may be sig-naled only for Slice 0. In the case of Tile 4, information indicating a slice height (e.g., slice_height_in_ctu_minus1) may be signaled only for Slice 2. In addition, a slice height may correspond to a CTU and/or CTB unit. As an example, when information indicating the number of slices partitioned within a tile (e.g., num_slices_in_minus1) is 0, a tile is equal to a slice and the height of the tile is equal to the height of the slice. Accordingly, information indicating a slice height (e.g., slice_height_in_ctu_minus1) may not be signaled.

FIG. 21 describes a method (syntax) by which slice information in a picture and a tile is signaled according to an embodiment of the present disclosure.

Figure 22:
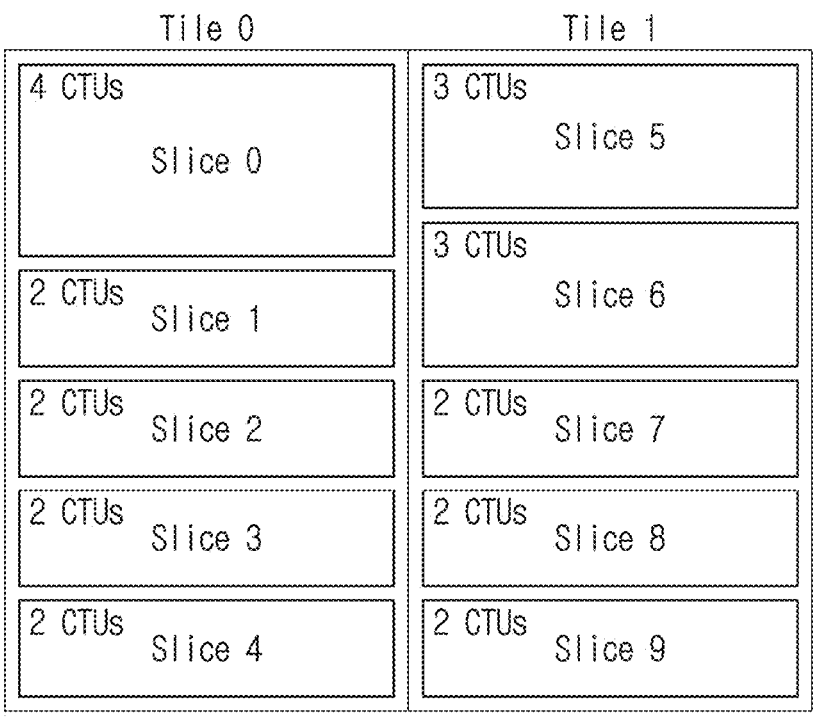
FIG. 22 describes slices constituting a tile according to an embodiment of the present disclosure.

FIG. 22 describes slices constituting a tile according to an embodiment of the present disclosure. A single picture and/or subpicture may be partitioned into one or more tiles. A single tile may be partitioned into one or more slices. Herein, in order to remove the redundancy of information indicating a slice height (e.g., slice_height_in_ctu_minus1), slice information may be signaled in a way similar to the method of signaling tile information described in FIG. 17.

Referring to FIG. 22, a single picture may be partitioned into two tiles, Tile 0 and Tile 1. Tile 0 and Tile 1 may be partitioned into 5 slices respectively. Information indicating the number of slices included in a current picture (e.g., num_slices_in_pic_minus1) may indicate 9. Tile 0 may be partitioned into 5 slices: Slice 0, Slice 1, Slice 2, Slice 3 and Slice 4. The height of Slice 0 may be 4, and the heights of the other slices (Slice 1, Slice 2, Slice 3 and Slice 4) may be commonly 2. Index may increase in order to increase from Slice 1 to Slice 4 in Tile 0.

In Tile 0, information indicating the number of slices partitioned within a tile (e.g., num_slices_in_minus1) may indicate 4. Information indicating a slice height with index 0 (e.g., slice_height_in_ctu_minus1[0]) may indicate 3. In addition, information indicating a slice height with index 1 (e.g., slice_height_in_ctu_minus1[1]) may indicate 1. In addition, information indicating a slice height with index 2 (e.g., slice_height_in_ctu_minus1[2]) may indicate 1. In addition, information indicating a slice height with index 3 (e.g., slice_height_in_ctu_minus1[3]) may indicate 1. In the case of Slice 4, which is the last slice, information indicating a slice height with index 4 (e.g., slice_height_in_ctu_minus1[4]) may be inferred by using a height value of a current tile. Specifically, information indicating a slice height with index 4 (e.g., slice_height_in_ctu_minus1[4]) may be inferred by subtracting information indicating a slice height with index 0 (e.g., slice_height_in_ctu_minus1[0]) plus 1, information indicating a slice height with index 1 (e.g., slice_height_in_ctu_minus1[1]) plus 1, information indicating a slice height with index 2 (e.g., slice_height_in_ctu_minus1[2]) plus 1, and information indicating a slice height with index 3 (e.g., slice_height_in_ctu_minus1[3]) plus 1, from a height value of a current tile.

As the slices with indexes 1 to 4 in Tile 0 commonly have a height of 2, information indicating a slice height (e.g., slice_height_in_ctu_minus1) may commonly indicate 1. As Tile 0 has 2 slices with different heights, information indi-cating the number of slice heights within a tile to be transmitted (e.g., num_exp_tile_columns_minus1) may indicate 1. Herein, information indicating a slice height with index 0 (e.g., slice_height_in_ctu_minus1[0]) may indicate 3. In addition, information indicating a slice height with index 1 (e.g., slice_height_in_ctu_minus1[1]) may indicate 1. Information indicating a slice height with index 1 (e.g, slice_height_in_ctu_minus1[1]) may be commonly applied to the remaining slices (Slice 2, Slice 3, and Slice 4). In addition, Slice 4, which is the last slice, may be inferred by using a information height of a current tile. Specifically, indicating a slice height with index 4 (e.g., slice_height_in_ctu_minus1[4]) may be inferred by subtracting information indicating a slice height with index 0 (e.g., slice_height_in_ctu_minus1[0]) plus 1, information indicat-ing a slice height with index 1 (e.g., slice_height_in_ctu_minus1[1]) plus 1, information indicating a slice height with index 2 (e.g., slice_height_in_ctu_minus1[2]) plus 1, and implicitly inferred information indicating a slice height with index 3 (e.g., slice_height_in_ctu_minus1[3]) plus 1, from a height value of a current tile.

Tile 0 may have a tile height corresponding to 12 CTUS and/or CTB units. Information indicating the number of slice heights within a tile to be transmitted (e.g., num_ex-p_tile_columns_minus1) may indicate 1. In addition, infor-mation indicating a slice height with index 1 (e.g., slice_height_in_ctu_minus1[1]) may indicate 1. Accord-ingly, Tile 0 may be composed of at least 2 slices. It may be inferred that the height may be commonly 2 from a third slice. When the height of Tile 0 is 12, the height of a remaining slice (RemainSlicesHeight) except Slice 0 and Slice 1 may be inferred through information indicating a slice height with index 0 (e.g., slice_height_in_ctu_minus1[0]) and information indicating a slice height with index 1 (e.g, slice_height_in_ctu_minus1[1]). Specifically, it may be inferred by subtracting information indicating a slice height with index 0 (e.g., slice_height_in_ctu_minus1[0]) plus 1 and information indicating a slice height with index 1 (e.g., slice_height_in_ctu_minus1[1]) plus 1 from the height of 12 of Tile 0. A height of a remaining slice except Slice 0 and Slice 1 (RemainSlicesHeight) may correspond to 6. As information indicating a slice height with index 1 (e.g., slice_height_in_ctu_minus1[1]) is commonly applied to a height of a remaining slice except Slice 0 and Slice 1 (RemainSlicesHeight), the number of remaining slices may be inferred.

Specifically, the height of a remaining slice (RemainSlicesHeight) may be expressed by the following formula: RemainSlicesHeight=a tile height (TileHeight)−{information indicating a slice height with index 0 (e.g., slice_height_in_ctu_minus1[0])+information indicating a slice height with index 1 (e.g., slice_height_in_ctu_minus1[1])+ the number of slice heights within a tile to be transmitted (NumExpSliceInTile)}.

Specifically, information on division of the number of slices (DivSliceNum) may be expressed by the following formula: DivSliceNum=Height of a remaining slice (RemainSlicesHeight)/{information indicating a slice height with index 1 (e.g., slice_height_in_ctu_minus1[1])+1}.

In [Height of a remaining slice (RemainSlicesHeight) {Information indicating a slice height with index 1 (e.g., slice_height_in_ctu_minus1[1])+1}], the slice remainder operation information (RemSliceNum) may be 1 or 0. Herein, the remainder (%) operation may be replaced by the modular operation.

When the height of a remaining slice (RemainSlicesHeight) is greater than 0 and is less than the sum of information indicating a slice height with index 1 (e.g., slice_height_in_ctu_minus1[1]) and 1, the number of the remaining slices within a current tile may be inferred as 1.

When the height of a remaining slice (RemainSlicesHeight) is equal to or greater than the sum of information indicating a slice height with index 1 (e.g., slice_height_in_ctu_minus1[1]) and 1, the number of the remaining slices within a current tile may be inferred by {Information on division of the number of slices (DivSliceNum)+Slice remainder operation information (RemSliceNum)}.

FIG. 23 describes a method (syntax) by which slice information in a picture and a tile is signaled according to another embodiment of the present disclosure.

FIG. 24 describes a method (syntax) by which slice information in a picture and a tile is signaled according to yet another embodiment of the present disclosure.

Referring to FIG. 24, pps_num_slices_in_pic_minus1 plus 1 may indicate the number of rectangular slices of each picture referring to PPS. The value of pps_num_slices_in_pic_minus1 may correspond to a range from 0 to MaxSlicesPerAu−1. When pps_no_pic_partition_flag is 1, a value of pps_num_slices_in_pic_minus1 may be inferred as 0. When pps_single_slice_per_subpic_flag is 1, a value of pps_num_slices_in_pic_minus1 may be inferred to be equal to sps_num_subpics_minus1.

When pps_tile_idx_delta_present_flag is 0, the syntax element pps_tile_idx_delta_val[i] may not exist in PPS. In addition, every picture referring to PPS may be partitioned into a rectangular slice row and a rectangular slice column according to a raster order. When pps_tile_idx_delta_present_flag is 1, the syntax element pps_tile_idx_delta_val [i] may exist in PPS. In addition, every rectangular slice of a picture referring to PPS may be designated in an order indicated by the value of pps_tile_idx_delta_val [i] as the value of i increases. When the syntax element pps_tile_idx_delta_val [i] does not exist in PPS, pps_tile_idx_delta_present_flag may be inferred as 1.

pps_slice_width_in_tiles_minus1[i] plus 1 may indicate a width of i-th rectangular slice in a tile column. The value of pps_slice_width_in_tiles_minus1[i] may range from 0 to NumTileColumns−1. When pps_slice_width_in_tiles_minus1 [i] does not exist, the value of pps_slice_width_in_tiles_minus1 [i] may be inferred as 0.

pps_slice_height_in_tiles_minus1 [i] plus 1 may indicate a height of i-th rectangular slice in a tile row, when pps_num_exp_slices_in_tile [i] is 0. The value of pps_slice_height_in_tiles_minus1 [i] may range from 0 to NumTileRows−1. When pps_slice_height_in_tiles_minus1 [i] does not exist, if SliceTopLeftTileIdx [i]/NumTileColumns is equal to NumTileRows−1, the value of pps_slice_height_in_tiles_minus1 [i] may be inferred as 0. When SliceTopLeftTileIdx [i]/NumTileColumns is not equal to NumTileRows−1, the value of pps_slice_height_in_tiles minus1 [i] may be inferred to be equal to pps_slice_height_in_tiles_minus1 [i−1].

pps_num_exp_slices_in_tile [i] may indicate the number of slice heights that are explicitly provided for a slice of tile including i-th slice. The tile may be a tile that has a same tile index as SliceTopLeftTileIdx [i]. The value of pps_num_exp_slices_in_tile [i] may range from 0 to RowHeight [SliceTopLeftTileIdx [i] NumTileColumns]−1. When pps_num_exp_slices_in_tile [i] does not exist, the value of pps_num_exp_slices_in_tile [i] may be inferred as 0. When pps_num_exp_slices_in_tile [i] is 0, a tile including i-th piece may not be partitioned into a plurality of pieces. When pps_num_exp_slices_in_tile [i] is not 0, a tile including i-th piece may or may not be partitioned into a plurality of pieces. Herein, pps_num_exp_slices_in_tile [i] may be greater than 0.

When pps_num_exp_slices_in_tile [i] is greater than 0, pps_exp_slice_height_in_ctus_minus1 [i][j] plus 1 may indicate a height of j-th rectangular slice in a tile including i-th slice in a unit of CTU row for j ranging from 0 to pps_num_exp_slices_in_tile [i]−1. pps_exp_slice_height_in_ctus_minus1 [i] may be used to infer a height of a rectangular slice in a tile including i-th slice greater than pps_num_exp_slices_in_tile [i]−1. The value of pps_exp_slice_height_in_ctus_minus1 [i][j] may range from 0 to RowHeight[SliceTopLeftTileIdx [i]/NumTileColumns]−1.

pps_tile_idx_delta_val [i] may indicate a difference between a tile index of a tile including a first CTU of (i+1) th rectangular slice and a tile index of a tile including a first CTU of i-th rectangular slice. The value of pps_tile_idx_delta_val [i] may have range from −NumTilesInPic+1 to NumTilesInPic−1. When pps_tile_idx_delta_val [i] does not exist, the value of pps_tile_idx_delta_val [i] may be inferred as 0. When pps_tile_idx_delta_val [i] exists, the value of pps_tile_idx_delta_val [i] is not 0. When pps_rect_slice_flag is 1 and SubpicIdxForSlice [idxA] is smaller than SubpicIdxForSlice, the value of idxA should be smaller than idxB for any two pieces having picture-level slice indexes idxA and idxB that belong to a same picture but different subpictures. The above-described condition may correspond to a bitstream conformance requirement.

FIG. 25 describes a method of encoding a video according to an embodiment of the present disclosure.

Referring to FIG. 25, when a current picture is composed of a plurality of tiles and a current tile among the plurality of tiles is partitioned into a plurality of slices, information on the number of slices in a tile, which indicates the number of the plurality of slices included in the current tile, may be generated (S2510).

In addition, information on a slice height within a tile, which indicates a height of the plurality of slices included in the current tile, may be generated (S2520).

In addition, a bitstream including the information on the number of slices in a tile and the information on the slice height in a tile may be generated (S2530).

According to an embodiment, for a last slice among a plurality of slices included in a current tile, information on a slice height in tile may not be generated.

According to embodiment, an rectangular slice information indicating whether or not one or slices included in a current picture are rectangular may be generated. When one or more slices are rectangular, information on the number of slices in tile and information on a slice height in tile may be encoded.

According to an embodiment, single slice information indicating whether or not only one slice is included in a current picture may be generated. When a plurality of slices are included in the current picture, the information on the number of slices in tile and the information on the slice height in tile may be encoded.

According to an embodiment, when a plurality of slices are included in a current picture, information on the number of slices in picture, which indicates the number of the plurality of slices in the current picture, may be generated.

According to an embodiment, slice size information indicating a size of a current slice in tile units among a plurality of slices included in the current picture may be generated. When a size of the current slice is equal to or smaller than a size of the current tile, information on the number of slices in tile may be generated.

According to an embodiment, information on the number of slice heights in tile, which indicates the number of a plurality of slice height types included in a current tile, may be generated.

According to an embodiment, single tile information indicating whether or not a plurality of tiles are included in a current picture may be generated. When the plurality of tiles are included in the current picture, tile height information indicating a height of the plurality of tiles and tile width information indicating a width of the plurality of tiles may be generated.

According to an embodiment, tile width information for a width of a right boundary tile existing on a right boundary of a current picture among a plurality of tiles may not be generated.

According to an embodiment, tile height information for a row height of a bottom boundary tile existing on a bottom boundary of a current picture among a plurality of tiles may not be generated.

According to an embodiment, information on a slice height in the tile may be generated only for a first slice among a plurality of successive slices including a last slice of the tile and having a same height.

Figure 26:
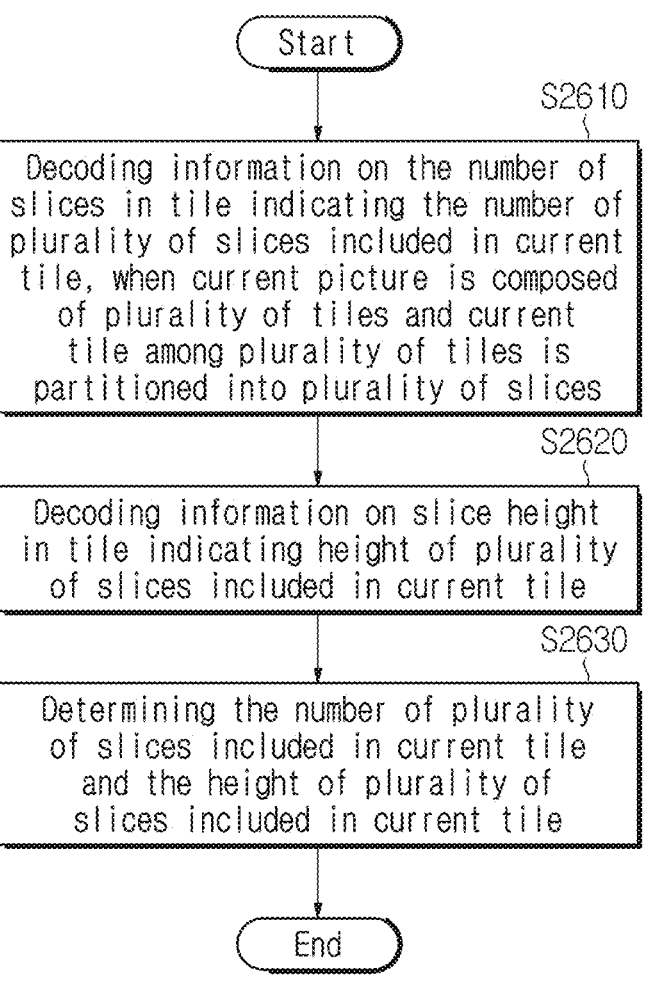
FIG. 26 describes a method of encoding a video according to an embodiment of the present disclosure.

FIG. 26 describes a method of decoding a video according to an embodiment of the present disclosure.

Referring to FIG. 25, when a current picture is composed of a plurality of tiles and a current tile among the plurality of tiles is partitioned into a plurality of slices, information on the number of slices in a tile, which indicates the number of the plurality of slices included in the current tile, may be decoded (S2610).

In addition, information on a slice height within a tile, which indicates a height of the plurality of slices included in the current tile, may be decoded (S2620).

In addition, the number of the plurality of slices included in the current tile and a height of the plurality of slices included in the current tile may be determined (S2630).

According to an embodiment, the height of the plurality of slices indicated by the information on a slice height in tile may correspond to CTUs (Coding Tree Units) or CTBs (Coding Tree Blocks).

According to an embodiment, a last slice among the plurality of slices included in the current tile may be inferred using a height of the current tile and a height of the remaining slices except the last slice.

According to an embodiment, rectangular slice information indicating whether or not one or slices included in a current picture are rectangular may be decoded. When one or more slices are rectangular, information on the number of slices in tile and information on a slice height in tile may be decoded.

According to an embodiment, single slice information indicating whether or not only one slice is included in a current picture may be decoded. When a plurality of slices are included in the current picture, the information on the number of slices in tile and the information on the slice height in tile may be decoded.

According to an embodiment, when a plurality of slices are included in a current picture, information on the number of slices in picture, which indicates the number of the plurality of slices in the current picture, may be decoded.

According to an embodiment, slice size information indicating a size of a current slice in tile units among a plurality of slices included in a current picture may be decoded. When the size of the current slice is equal to or smaller than a size of a current tile, information on the number of slices in tile may be decoded.

According to an embodiment, information on the number of slice heights in tile, which indicates the number of a plurality of slice height types included in a current tile, may be decoded.

According to an embodiment, single tile information indicating whether or not a plurality of tiles are included in a current picture may be decoded. When the plurality of tiles are included in the current picture, tile height information indicating a height of the plurality of tiles and tile width information indicating a width of the plurality of tiles may be decoded.

According to an embodiment, a width of a right boundary tile existing on a right boundary of a current picture among a plurality of tiles may be inferred using a width of the current picture and a width of the remaining tiles on the same row as the right boundary tile.

According to an embodiment, a height of a row of a bottom boundary tile existing on a bottom boundary of a current picture among a plurality of tiles may be inferred using a height of the current picture and a height of the remaining tiles on the same column as the bottom boundary tile.

According to an embodiment, information on a slice height in the tile may be decoded only for a first slice among a plurality of successive slices including a last slice of the tile and having a same height.

According to an embodiment, a computer-readable recording medium may be provided which stores video encoding data that are decoded according to a video decoding method.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and be recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skill in the computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high-level language code that may be implemented by a computer using an interpreter. In order to implement processes according to the present disclosure, the hardware devices may be configured to be operable through one or more software modules or vice versa.

Although the present disclosure has been described in terms of specific items such as detailed elements as well as the limited embodiments and the drawings, they are only provided to help more general understanding of the invention, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the invention.

The invention claimed is:

1. A method of decoding a video, the method comprising:
partitioning a current picture into a plurality of tiles;
determining whether a rectangular slice mode is applied to the current picture or not; and
in response to the rectangular slice mode being applied to the current picture, partitioning a tile among the plurality of tiles into a plurality of slices,
wherein the tile is partitioned only in a horizontal direction to generate the plurality of slices,
wherein the tile is partitioned into the plurality of slices based on slice number information indicating a number of slices for which height information is explicitly signaled, wherein a height of a first slice of which an order is less than or equal to the number of slices is determined based on the height information explicitly decoded from a bitstream, and
wherein a height of a second slice of which an order is greater than the number of slices is determined based on a height of a previous slice for which the height information is decoded lastly.

2. The video decoding method of claim 1,
wherein the height information represents a height of a slice in a unit of CTU (Coding Tree Unit).

3. The video decoding method of claim 1,
wherein in response to the second slice being a last slice among the plurality of slices, the height of the second slice is determined as the remaining height of the tile.

4. The video decoding method of claim 1, wherein in response to the rectangular slice mode being applied to the current picture, slice-tile width information and slice-tile height information are explicitly signaled for a slice,
wherein the slice-tile width information represents a value subtracting 1 from a width of the slice represented in a unit of tile columns, and
wherein the slice-tile height information represents a value subtracting 1 from a height of the slice represented in a unit of tile rows.

5. The video decoding method of claim 4, wherein the slice number information is decoded from the bitstream when both the slice-tile width information and the slice-tile height information are 0.

6. The video decoding method of claim 5, further comprising:
wherein when the slice-tile width information or the slice-tile height information is greater than 0, the slice is composed of a plurality of tiles, and
wherein when both the slice-tile width information and the slice-tile height information are 0, the slice is determined to have a equal to or smaller size than the tile.

7. A method of encoding a video, the method comprising:
partitioning a current picture into a plurality of tiles;
determining whether a rectangular slice mode is applied to the current picture or not; and
in response to the rectangular slice mode being applied to the current picture, partitioning a tile among the plurality of tiles into a plurality of slices,
wherein the tile is partitioned only in a horizontal direction to generate the plurality of slices,
wherein slice number information indicating a number of slices for which height information is explicitly encoded is encoded into a bitstream,
wherein, for a first slice of which an order is less than or equal to the number of slices, the height information is explicitly encoded,
wherein, for a second slice of which an order is greater than the number of slices, encoding the height information is omitted, the first slice and the second slice being included in the tile, and
wherein a height of the second slice is the same as a height of a previous slice for which the height information is encoded lastly.

8. The video encoding method of claim 7,
wherein the height information represents a height of a slice in a unit of CTU (Coding Tree Unit).

9. The video encoding method of claim 7, wherein rectangular slice information indicating whether the rectangular slice mode is applied to the current picture or not is encoded into the bitstream, wherein in response to the rectangular slice mode being applied, slice-tile width information and slice-tile height information are explicitly encoded for a slice, wherein the slice-tile width information represents a value subtracting 1 from a width of the slice represented in a unit of tile columns, and wherein the slice-tile height information represents a value subtracting 1 from a height of the slice represented in a unit of tile rows.

10. The video encoding method of claim 9, wherein the slice number information is encoded into the bitstream when both the slice-tile width information and the slice-tile height information are encoded as 0.

11. The video encoding method of claim 9, wherein when the slice is composed of a plurality of tiles, at least one of the slice-tile width information or the slice-tile height information is encoded with a value greater than 0, and wherein when the slice has a equal to or smaller size that the current slice, both the slice-tile width information and the slice-tile height information are encoded with a value 0.

12. A computer-readable recording medium for storing a bitstream comprising video encoding data which is generated by a video encoding method, wherein the video encoding method comprises:

partitioning a current picture into a plurality of tiles;

determining whether a rectangular slice mode is applied to the current picture or not; and in response to the rectangular slice mode being applied to the current picture, partitioning a tile among the plurality of tiles into a plurality of slices, wherein the tile is partitioned only in a horizontal direction to generate the plurality of slices, wherein slice number information indicating a number of slices for which height information is explicitly encoded is encoded into the bitstream, wherein, for a first slice of which an order is less than or equal to the number of slices, the height information is explicitly encoded, wherein, for a second slice of which an order is greater than the number of slices, encoding the height information is omitted, the first slice and the second slice being included in the tile, and wherein a height of the second slice is the same as a height of a previous slice for which the height information is encoded lastly.

\* \* \* \* \*